US009674858B2

(12) United States Patent
Elliott et al.

(10) Patent No.: US 9,674,858 B2
(45) Date of Patent: Jun. 6, 2017

(54) RECEIVER SCHEDULING IN WIRELESS NETWORKS

(71) Applicant: III Holdings 1, LLC, Wilmington, DE (US)

(72) Inventors: Brig Barnum Elliott, Arlington, MA (US); David Spencer Pearson, Bennington, VT (US)

(73) Assignee: III Holdings 1, LLC, Wilmington, DE (US)

( * ) Notice: Subject to any disclaimer, the term of this patent is extended or adjusted under 35 U.S.C. 154(b) by 39 days.

(21) Appl. No.: 14/538,563

(22) Filed: Nov. 11, 2014

(65) Prior Publication Data
US 2015/0063325 A1 Mar. 5, 2015

Related U.S. Application Data

(63) Continuation of application No. 12/537,085, filed on Aug. 6, 2009, which is a continuation of application
(Continued)

(51) Int. Cl.
*H04Q 7/10* (2006.01)
*H04W 72/12* (2009.01)
(Continued)

(52) U.S. Cl.
CPC .......... *H04W 72/1205* (2013.01); *H04J 3/16* (2013.01); *H04W 56/00* (2013.01);
(Continued)

(58) Field of Classification Search
CPC ............. H04W 72/1278; H04W 56/00; H04W 52/0219; H04W 84/18; H04W 84/20; H04W 88/08; H04L 12/403
(Continued)

(56) References Cited

U.S. PATENT DOCUMENTS 3,192,230 A   6/1965 Lunsford et al.
5,117,430 A * 5/1992 Berglund ............ H04L 12/403
                                                    340/635
(Continued)

FOREIGN PATENT DOCUMENTS

EP   1 022 876   7/2000
EP   1 102 454   5/2001
(Continued)

OTHER PUBLICATIONS

Amendment to Contract No. N3998-96-C-5021 (1997).
(Continued)

*Primary Examiner* — Ajit Patel
*Assistant Examiner* — Julio Perez
(74) *Attorney, Agent, or Firm* — Volpe and Koenig, P.C.

(57) ABSTRACT

A wireless apparatus may receive scheduling definitions from a networking device. The wireless apparatus may determine, from the scheduling definitions, downlink transmission times and to start a timer at one of the determined downlink transmission times. The wireless apparatus may discontinue reception at expiration of the timer. The wireless apparatus may also, in response to reception of a downlink transmission, transmit an acknowledgement and to discontinue reception before the timer has expired.

24 Claims, 18 Drawing Sheets

Related U.S. Application Data

No. 12/253,130, filed on Oct. 16, 2008, now Pat. No. 7,979,096, which is a continuation of application No. 12/174,512, filed on Jul. 16, 2008, now Pat. No. 7,623,897, which is a continuation of application No. 10/328,566, filed on Dec. 23, 2002, now Pat. No. 7,421,257, which is a continuation-in-part of application No. 09/998,946, filed on Nov. 30, 2001, now Pat. No. 7,020,501.

(51) Int. Cl.
    *H04W 56/00*     (2009.01)
    *H04J 3/16*     (2006.01)
    *H04W 84/18*     (2009.01)
    *H04W 52/02*     (2009.01)

(52) U.S. Cl.
    CPC .... *H04W 72/1278* (2013.01); *H04W 52/0216* (2013.01); *H04W 52/0219* (2013.01); *H04W 84/18* (2013.01); *Y02B 60/50* (2013.01)

(58) Field of Classification Search
    USPC ............ 455/574, 127.5, 343.1, 127.1, 455/343.2–343.4; 370/440, 445, 311
See application file for complete search history.

(56) References Cited

U.S. PATENT DOCUMENTS

| | | |
|---|---|---|
| 5,247,285 A | 9/1993 | Yokota et al. |
| 5,297,142 A | 3/1994 | Paggeot et al. |
| 5,307,297 A | 4/1994 | Iguchi et al. |
| 5,371,734 A | 12/1994 | Fischer et al. |
| 5,371,764 A | 12/1994 | Gillingham et al. |
| 5,481,265 A | 1/1996 | Russell |
| 5,515,369 A | 5/1996 | Flammer, III et al. |
| 5,517,505 A | 5/1996 | Buchholz et al. |
| 5,528,587 A | 6/1996 | Galand et al. |
| 5,541,912 A | 7/1996 | Choudhury et al. |
| 5,583,866 A | 12/1996 | Vook et al. |
| 5,598,419 A | 1/1997 | Weigand et al. |
| 5,602,841 A | 2/1997 | Lebizay et al. |
| 5,604,735 A | 2/1997 | Levinson et al. |
| 5,649,119 A | 7/1997 | Kondoh et al. |
| 5,680,768 A | 10/1997 | Park |
| 5,696,765 A | 12/1997 | Safadi |
| 5,699,357 A | 12/1997 | Carvey |
| 5,721,733 A | 2/1998 | Wang et al. |
| 5,737,328 A | 4/1998 | Norman et al. |
| 5,752,202 A | 5/1998 | Obright |
| 5,781,028 A | 7/1998 | Decuir |
| 5,832,492 A | 11/1998 | Wooten |
| 5,848,064 A | 12/1998 | Cowan |
| 5,857,080 A | 1/1999 | Jander et al. |
| 5,896,375 A | 4/1999 | Dent et al. |
| 5,903,777 A | 5/1999 | Brief |
| 5,909,183 A | 6/1999 | Borgstahl et al. |
| 5,933,611 A | 8/1999 | Shakkarwar |
| 5,974,327 A | 10/1999 | Agrawal et al. |
| 6,005,854 A | 12/1999 | Xu et al. |
| 6,005,869 A | 12/1999 | Sakai et al. |
| 6,011,486 A | 1/2000 | Casey |
| 6,011,784 A | 1/2000 | Brown et al. |
| 6,026,297 A | 2/2000 | Haartsen |
| 6,028,857 A | 2/2000 | Poor |
| 6,052,779 A | 4/2000 | Jackson et al. |
| 6,061,687 A | 5/2000 | Wooten |
| 6,067,301 A | 5/2000 | Aatresh |
| 6,069,896 A | 5/2000 | Borgstahl et al. |
| 6,079,033 A | 6/2000 | Jacobson, Jr. et al. |
| 6,094,435 A | 7/2000 | Hoffman et al. |
| 6,097,707 A | 8/2000 | Hodzic et al. |
| 6,097,733 A | 8/2000 | Basu et al. |
| 6,115,390 A | 9/2000 | Chuah |
| 6,128,290 A | 10/2000 | Carvey |
| 6,128,492 A | 10/2000 | Chung |
| 6,192,230 B1 | 2/2001 | Van Bokhorst et al. |
| 6,208,247 B1 * | 3/2001 | Agre et al. ............... 340/539.19 |
| 6,249,740 B1 | 6/2001 | Ito et al. |
| 6,256,682 B1 | 7/2001 | Gudan et al. |
| 6,272,140 B1 | 8/2001 | La Rowe et al. |
| 6,272,567 B1 | 8/2001 | Pal et al. |
| 6,279,060 B1 | 8/2001 | Luke et al. |
| 6,282,183 B1 | 8/2001 | Harris et al. |
| 6,292,508 B1 | 9/2001 | Hong et al. |
| 6,314,091 B1 | 11/2001 | La Rowe et al. |
| 6,331,972 B1 | 12/2001 | Harris et al. |
| 6,351,468 B1 | 2/2002 | La Rowe et al. |
| 6,381,467 B1 | 4/2002 | Hill et al. |
| 6,385,174 B1 * | 5/2002 | Li ................................ 370/252 |
| 6,414,955 B1 * | 7/2002 | Clare et al. ................... 370/390 |
| 6,415,342 B1 | 7/2002 | Wahl et al. |
| 6,421,347 B1 | 7/2002 | Borgstahl et al. |
| 6,424,623 B1 | 7/2002 | Borgstahl et al. |
| 6,434,158 B1 | 8/2002 | Harris et al. |
| 6,434,159 B1 | 8/2002 | Woodward et al. |
| 6,487,180 B1 | 11/2002 | Borgstahl et al. |
| 6,492,904 B2 | 12/2002 | Richards et al. |
| 6,505,052 B1 | 1/2003 | Jou |
| 6,532,220 B1 | 3/2003 | Carneal et al. |
| 6,535,947 B1 | 3/2003 | Amoni et al. |
| 6,564,074 B2 | 5/2003 | Romans |
| 6,570,857 B1 | 5/2003 | Haartsen et al. |
| 6,574,266 B1 | 6/2003 | Haartsen |
| 6,574,453 B1 | 6/2003 | Honda et al. |
| 6,590,928 B1 | 7/2003 | Haartsen |
| 6,593,768 B1 | 7/2003 | Iyer et al. |
| 6,633,538 B1 | 10/2003 | Tanaka et al. |
| 6,633,753 B1 | 10/2003 | Kido |
| 6,694,149 B1 | 2/2004 | Ady et al. |
| 6,697,649 B1 | 2/2004 | Bennett et al. |
| 6,704,293 B1 | 3/2004 | Larsson et al. |
| 6,715,071 B2 | 3/2004 | Ono et al. |
| 6,721,273 B1 | 4/2004 | Lyon |
| 6,748,451 B2 | 6/2004 | Woods et al. |
| 6,754,188 B1 | 6/2004 | Garahi et al. |
| 6,760,584 B2 | 7/2004 | Jou |
| 6,775,258 B1 | 8/2004 | Van Valkenburg et al. |
| 6,789,196 B1 | 9/2004 | Miyano |
| 6,804,232 B1 | 10/2004 | Donaghey |
| 6,807,163 B1 | 10/2004 | Shi |
| 6,816,460 B1 | 11/2004 | Ahmed et al. |
| 6,816,510 B1 * | 11/2004 | Banerjee ...................... 370/503 |
| 6,901,465 B2 | 5/2005 | Kamihara et al. |
| 6,977,895 B1 | 12/2005 | Shi et al. |
| 7,020,501 B1 | 3/2006 | Elliott et al. |
| 7,020,701 B1 | 3/2006 | Gelvin et al. |
| 7,035,240 B1 * | 4/2006 | Balakrishnan et al. ...... 370/338 |
| 7,218,633 B2 | 5/2007 | Donaghey |
| 7,386,003 B1 | 6/2008 | Donaghey |
| 7,421,257 B1 | 9/2008 | Elliott |
| 7,653,394 B2 * | 1/2010 | McMillin ..................... 455/444 |
| 2001/0029178 A1 | 10/2001 | Criss et al. |
| 2002/0027894 A1 | 3/2002 | Arrakoski et al. |
| 2002/0071395 A1 | 6/2002 | Redi et al. |
| 2002/0082035 A1 | 6/2002 | Aihara et al. |
| 2002/0184385 A1 | 12/2002 | Kato |
| 2003/0012168 A1 | 1/2003 | Elson et al. |
| 2003/0066090 A1 | 4/2003 | Traw et al. |
| 2003/0119568 A1 | 6/2003 | Menard |
| 2003/0146871 A1 | 8/2003 | Karr et al. |
| 2004/0196784 A1 | 10/2004 | Larsson et al. |
| 2005/0215280 A1 * | 9/2005 | Twitchell, Jr. ............ 455/553.1 |
| 2006/0121861 A1 * | 6/2006 | Diepstraten ............... H04L 7/04 455/130 |
| 2006/0246869 A1 | 11/2006 | Ohlenbusch et al. |

FOREIGN PATENT DOCUMENTS

| | | |
|---|---|---|
| WO | 96/14697 | 5/1996 |
| WO | 99/14898 | 3/1999 |

(56) References Cited

FOREIGN PATENT DOCUMENTS

| WO | 00/68811 | 11/2000 |
|---|---|---|
| WO | 2005/005126 | 1/2005 |

OTHER PUBLICATIONS

Barber et al., "Designing for Wireless LAN Communications," IEEE Circuits and Devices, 4:12, pp. 29-33 (1996).

Barber, Jr., Paper submitted to MIT. BodyLAN ™: A Low-Power Communications System (Feb. 1996).

Bers, A Body Model Server for Human Motion Capture and Representation, Presence, vol. 5, No. 4, pp. 381-392 (Fall 1996).

Boch, High Bandwidth MM-Wave Indoor Wireless Local Area Networks, Microwave Journal, pp. 152, 154-158 (Jan. 1996).

Butterfly Wireless Connectivity for Interactive Multimedia, Spec Sheet, Butterfly Communications, Inc. (1997).

Butterfly Wireless RF Solution, Spec Sheet, Butterfly Communications, Inc. (Nov. 1997).

Carvey, "Technology for the Wireless Interconnection of Wearable Personal Electronic Accessories," VLSI Signal Processing IX, pp. 13-22 (1996).

Clare et al., "Self-Organizing Distributed Sensor Networks," University of California Los Angeles/Rockwell Science Center, 9 pp. (Mar. 7, 2001).

Contract No. N3998-96-C-5021 (1996).

Notice of Allowance, U.S. Appl. No. 09/535,591, dated Feb. 10, 2004.

Notice of Allowance, U.S. Appl. No. 09/536,191, dated Feb. 6, 2008.

Notice of Allowance, U.S. Appl. No. 09/998,946, dated Oct. 26, 2005.

Notice of Allowance, U.S. Appl. No. 10/328,566, dated May 15, 2008.

Notice of Allowance, U.S. Appl. No. 10/894,406, dated Dec. 27, 2006.

Notice of Allowance, U.S. Appl. No. 12/174,512 dated Oct. 7, 2009.

Notice of Allowance, U.S. Appl. No. 12/253,130, dated Apr. 15, 2011.

Notice of Allowance, U.S. Appl. No. 12/537,010 dated Apr. 18, 2011.

Office Action Summary, U.S. Appl. No. 09/535,591, dated Sep. 10, 2003.

Office Action Summary, U.S. Appl. No. 09/536,191, dated Dec. 15, 2004.

Office Action Summary, U.S. Appl. No. 09/536,191, dated Jun. 29, 2005.

Office Action Summary, U.S. Appl. No. 09/536,191, dated Oct. 17, 2005.

Office Action Summary, U.S. Appl. No. 09/536,191, dated Feb. 6, 2007.

Office Action Summary, U.S. Appl. No. 09/536,191, dated Aug. 7, 2007.

Office Action Summary, U.S. Appl. No. 09/998,946, dated Oct. 5, 2004.

Office Action Summary, U.S. Appl. No. 09/998,946, dated May 18, 2005.

Office Action Summary, U.S. Appl. No. 10/328,566, dated Jun. 29, 2005.

Office Action Summary, U.S. Appl. No. 10/328,566, dated Jan. 12, 2006.

Office Action Summary, U.S. Appl. No. 10/328,566, dated Apr. 21, 2006.

Office Action Summary, U.S. Appl. No. 10/328,566, dated Oct. 18, 2006.

Office Action Summary, U.S. Appl. No. 10/328,566, dated Jun. 15, 2007.

Office Action Summary, U.S. Appl. No. 10/328,566, dated Dec. 13, 2007.

Office Action Summary, U.S. Appl. No. 10/649,030, dated Nov. 16, 2007.

Office Action Summary, U.S. Appl. No. 10/786,335, dated Nov. 2, 2007.

Office Action Summary, U.S. Appl. No. 10/894,406, dated Oct. 21, 2005.

Office Action Summary, U.S. Appl. No. 12/174,512 dated Mar. 9, 2009.

Office Action Summary, U.S. Appl. No. 12/253,130, dated Dec. 29, 2010.

Office Action Summary, U.S. Appl. No. 12/253,130, dated Jun. 29, 2009.

Office Action Summary, U.S. Appl. No. 12/253,130, dated Nov. 30, 2009.

Office Action Summary, U.S. Appl. No. 12/253,130, dated Mar. 31, 2010.

Office Action Summary, U.S. Appl. No. 12/537,085, dated Feb. 1, 2011.

Office Action Summary, U.S. Appl. No. 12/537,010, dated May 28, 2010.

Office Action Summary, U.S. Appl. No. 12/537,085, dated May 14, 2010.

Office Action Summary, U.S. Appl. No. 12/537,010, dated Dec. 21, 2010.

Office Action Summary, U.S. Appl. No. 12/537,085, dated Jan. 3, 2012.

Office Action Summary, U.S. Appl. No. 12/537,085, dated Dec. 20, 2012.

Doherty, "Algorithms for Position and Data Recovery in Wireless Sensor Netowrks," Univseity of California at Berkeley, 54 pp. (Mar. 7, 2001).

Draft, An Introduction to USB 2.0—Draft 0.9 (1999).

Goyal et al., "MCM Design Methodology for Portable Wireless Communications Systems Design," Proceedings of the SPIE, vol. 2794, pp. 230-233 (1996).

Iyer—Intel Corporation, USB Engineering Change Notice—USB Cable Parameters, USB Specification Rev. 1.1 (Oct. 7, 1999).

Kardach, "Bluetooth Architecture Overview," Intel Corporation, 1998.

LaRowe, "PAN Feasibility: The BodyLAN Experience," GTE Internetworking—BBN Technologies (Mar. 1998).

Liu et al., "Simulation Modeling of Large-Scale Ad-hoc Sensor Networks," European Simulation Interoperability Workshop, University of Westminster, London, 12 pp. (Jun. 25-27, 2001).

Liu et al., Bluetooth Scatternet Route Structure for Multihop Ad Hoc Networks, IEEE Journal on Selected Areas in Communications, 21:2, pp. 229-239 (Feb. 2003).

Navarro, Simulation of Heterogeneous Optical Channel for Indoor Wireless Infrared Communications, Proceedings of Melecon '96, pp. 1035-1038 (May 1996).

Retrieved Feb. 9, 2006 from http://www.unf.edu/ccec/ieee/prev_mesa_1998.html 1998 IEEE Computer Elements MESA Workshop (1998).

Retrieved Feb. 9, 2006 from http://www.wlan01.wpi.edu/scripts/history.html—The Third IEEE Workshop on Wireless LANs: History.

Retrieved from http://www.nap.edu 1997 Energy Efficient Technologies for the Dismounted Soldier, pp. 65-111 (1997).

Specification of the Bluetooth System, vol. I (Dec. 1, 1999).

Specification of the Bluetooth System, vol. II (Dec. 1, 1999).

U.S. Appl. No. 12/174,512, filed Jul. 16, 2008.

U.S. Appl. No. 12/537,010, filed Aug. 6, 2009.

U.S. Appl. No. 12/537,085, filed Aug. 6, 2009.

U.S. Appl. No. 12/699,836, filed Feb. 3, 2010.

U.S. Appl. No. 12/699,842, filed Feb. 3, 2010.

U.S. Appl. No. 12/699,846, filed Feb. 3, 2010.

Universal Serial Bus Specification 2.0 (Apr. 2000).

Universal Serial Bus Specification 2.0 (draft 0.79), p. 151 (Oct. 5, 1999).

Universal Serial Bus Specification, Revision 1.1, Compaq, Intel, Microsoft, NEC (Sep. 23, 1998).

(56) References Cited

OTHER PUBLICATIONS

Universal Serial Bus: Plug-and-Play C Single PC (Part 1 of 2); Technical Perspective, www.cypress.com/design/techarticles/v3n1p4.html (Aug. 16, 1999).

Universal Serial Bus: Plug-and-Play Connectivity for Multiple Peripherals on Single PC (Part 2 of 2); Technical Perspective, www.cypress.com/design/techarticles/v3n1p5.html (Aug. 16, 1999).

Van Dyck, "Distributed Sensor Processing Over an Ad Floc Wireless Network: Simulation Framework and Performance Criteria," NIST 2001.

\* cited by examiner

RECEIVER SCHEDULING IN WIRELESS NETWORKS

CROSS REFERENCE TO RELATED APPLICATIONS

This application is a continuation of U.S. patent application Ser. No. 12/537,085, filed Aug. 6, 2009, which is a continuation of U.S. patent application Ser. No. 12/253,130, filed Oct. 16, 2008, which issued as U.S. Pat. No. 7,979,096 on Jul. 12, 2011, which is a continuation of U.S. patent application Ser. No. 12/174,512, filed Jul. 16, 2008, which issued as U.S. Pat. No. 7,623,897 on Nov. 24, 2009, which is a continuation of U.S. patent application Ser. No. 10/328,566, filed Dec. 23, 2002, which issued as U.S. Pat. No. 7,421,257 on Sep. 2, 2008, which is a continuation-in-part of U.S. patent application Ser. No. 09/998,946, filed Nov. 30, 2001, which issued as U.S. Pat. No. 7,020,501 on Mar. 28, 2006, all of which are hereby incorporated by reference as if fully set forth.

This application is related to U.S. patent application Ser. No. 12/537,010, filed Aug. 6, 2009, which issued as U.S. Pat. No. 7,979,098 on Jul. 12, 2011. This application is also related to U.S. patent application Ser. No. 13/442,109, filed Apr. 9, 2012, now abandoned.

FIELD OF THE INVENTION

The present invention relates generally to ad-hoc, multi-node wireless networks and, more particularly, to systems and methods for implementing energy efficient data forwarding mechanisms in such networks.

BACKGROUND OF THE INVENTION

Recently, much research has been directed towards the building of networks of distributed wireless sensor nodes. Sensor nodes in such networks conduct measurements at distributed locations and relay the measurements, via other sensor nodes in the network, to one or more measurement data collection points. Sensor networks, generally, are envisioned as encompassing a large number (N) of sensor nodes (e.g., as many as tens of thousands of sensor nodes), with traffic flowing from the sensor nodes into a much smaller number (K) of measurement data collection points using routing protocols. These routing protocols conventionally involve the forwarding of routing packets throughout the sensor nodes of the network to distribute the routing information necessary for sensor nodes to relay measurements to an appropriate measurement data collection point.

A key problem with conventional sensor networks is that each sensor node of the network operates for extended periods of time on self-contained power supplies (e.g., batteries or fuel cells). For the routing protocols of the sensor network to operate properly, each sensor node must be prepared to receive and forward routing packets at any time. Each sensor node's transmitter and receiver, thus, conventionally operates in a continuous fashion to enable the sensor node to receive and forward the routing packets essential for relaying measurements from a measuring sensor node to a measurement data collection point in the network. This continuous operation depletes each node's power supply reserves and, therefore, limits the operational life of each of the sensor nodes.

Therefore, there exists a need for mechanisms in a wireless sensor network that enable the reduction of sensor node power consumption while, at the same time, permitting the reception and forwarding of the routing packets necessary to implement a distributed wireless network.

SUMMARY OF THE INVENTION

Systems and methods consistent with the present invention address this need and others by providing mechanisms that enable sensor node transmitters and receivers to be turned off, and remain in a "sleep" state, for substantial periods, thus, increasing the energy efficiency of the nodes. Systems and methods consistent with the present invention further implement transmission and reception schedules that permit the reception and forwarding of packets containing routing, or other types of data, during short periods when the sensor node transmitters and receivers are powered up and, thus, "awake." The present invention, thus, increases sensor node operational life by reducing energy consumption while permitting the reception and forwarding of the routing messages needed to self-organize the distributed network.

In accordance with the purpose of the invention as embodied and broadly described herein, a method of conserving energy in a node in a wireless network includes receiving a first powering-on schedule from another node in the network, and selectively powering-on at least one of a transmitter and receiver based on the received first schedule.

In another implementation consistent with the present invention, a method of conveying messages in a sensor network includes organizing a sensor network into a hierarchy of tiers, transmitting one or more transmit/receive scheduling messages throughout the network, and transmitting and receiving data messages between nodes in adjacent tiers based on the one or more transmit/receive scheduling messages.

In a further implementation consistent with the present invention, a method of conserving energy in a multi-node network includes organizing the multi-node network into tiers, producing a transmit/receive schedule at a first tier in the network, and controlling the powering-on and powering-off of transmitters and receivers in nodes in a tier adjacent to the first tier according to the transmit/receive schedule.

In yet another implementation consistent with the present invention, a method of forwarding messages at a first node in a network includes receiving scheduling messages from a plurality of nodes in the network, selecting one of the plurality of nodes as a parent node, and selectively forwarding data messages to the parent node based on the received scheduling message associated with the selected one of the plurality of nodes.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms for conserving energy in wireless nodes by transmitting scheduling messages throughout the nodes of the network. The scheduling messages include time schedules for selectively powering-on and powering-off node transmitters and receivers. Message datagrams and routing messages may, thus, be conveyed throughout the network during appropriate transmitter/receiver power-on and power-off intervals.

Exemplary Network

Figure 1:
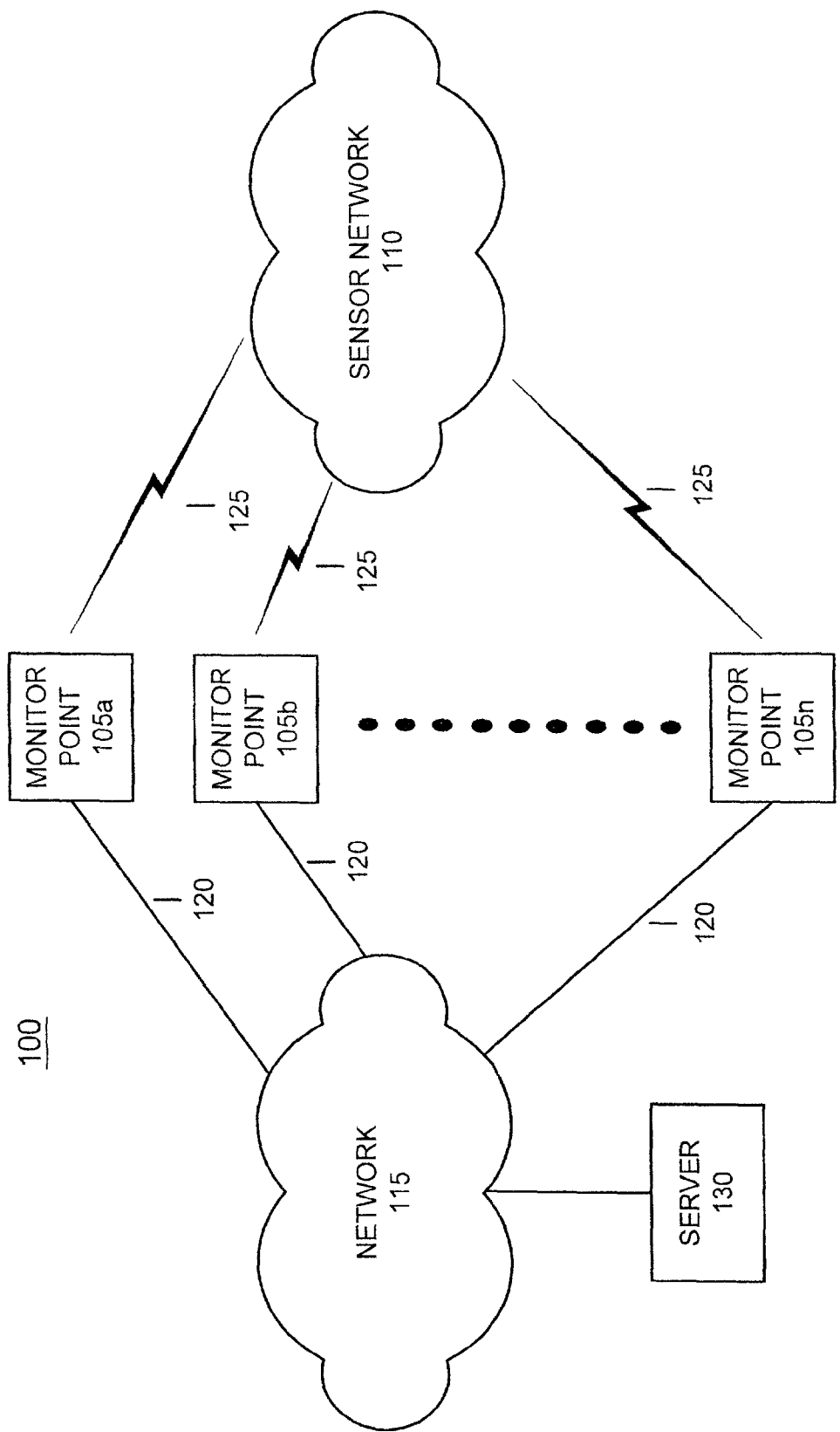
FIG. 1 illustrates an exemplary network consistent with the present invention.

FIG. 1 illustrates an exemplary network 100, consistent with the present invention. Network 100 may include monitor points 105a-105n connected to sensor network 110 and network 115 via wired 120, wireless 125, or optical connection links (not shown). Network 100 may further include one or more servers 130 interconnected with network 115.

Monitor points 105a-105n may include data transceiver units for transmitting messages to, and receiving messages from, one or more sensors of sensor network 110. Such messages may include routing messages containing network routing data, message datagrams containing sensor measurement data, and schedule messages containing sensor node transmit and receive scheduling data. The routing messages may include identification data for one or more monitor points, and the number of hops to reach each respective identified monitor point, as determined by a sensor node/monitor point that is the source of the routing message. The routing messages may be transmitted as wireless broadcast messages in network 100. The routing messages, thus, permit sensor nodes to determine a minimum hop path to a monitor point in network 100. Through the use of routing messages, monitor points 105a-105n may operate as "sinks" for sensor measurements made at nearby sensor nodes. Message datagrams may include sensor measurement data that may be transmitted to a monitor point 105a-105n for data collection. Message datagrams may be sent from a monitor point to a sensor node, from a sensor node to a monitor point, or from a sensor node to a sensor node.

Sensor network 110 may include one or more distributed sensor nodes (not shown) that may organize themselves into an ad-hoc, multi-hop wireless network. Each of the distributed sensor nodes of sensor network 110 may include one or more of any type of conventional sensing device, such as, for example, acoustic sensors, motion-detection sensors, radar sensors, sensors that detect specific chemicals or families of chemicals, sensors that detect nuclear radiation or biological agents, magnetic sensors, electronic emissions signal sensors, thermal sensors, and visual sensors that detect or record still or moving images in the visible or other spectrum. Sensor nodes of sensor network 110 may perform one or more measurements over a sampling period and transmit the measured values via packets, datagrams, cells or the like to monitor points 105a-105n.

Network 115 may include one or more networks of any type, including a Public Land Mobile Network (PLMN), Public Switched Telephone Network (PSTN), local area network (LAN), metropolitan area network (MAN), wide area network (WAN), Internet, or Intranet. The one or more PLMNs may further include packet-switched sub-networks, such as, for example, General Packet Radio Service (GPRS), Cellular Digital Packet Data (CDPD), and Mobile IP sub-networks.

Server 130 may include a conventional computer, such as a desktop, laptop or the like. Server 130 may collect data, via network 115, from each monitor point 105 of network 100 and archive the data for future retrieval.

Exemplary Sensor Network

Figure 2:
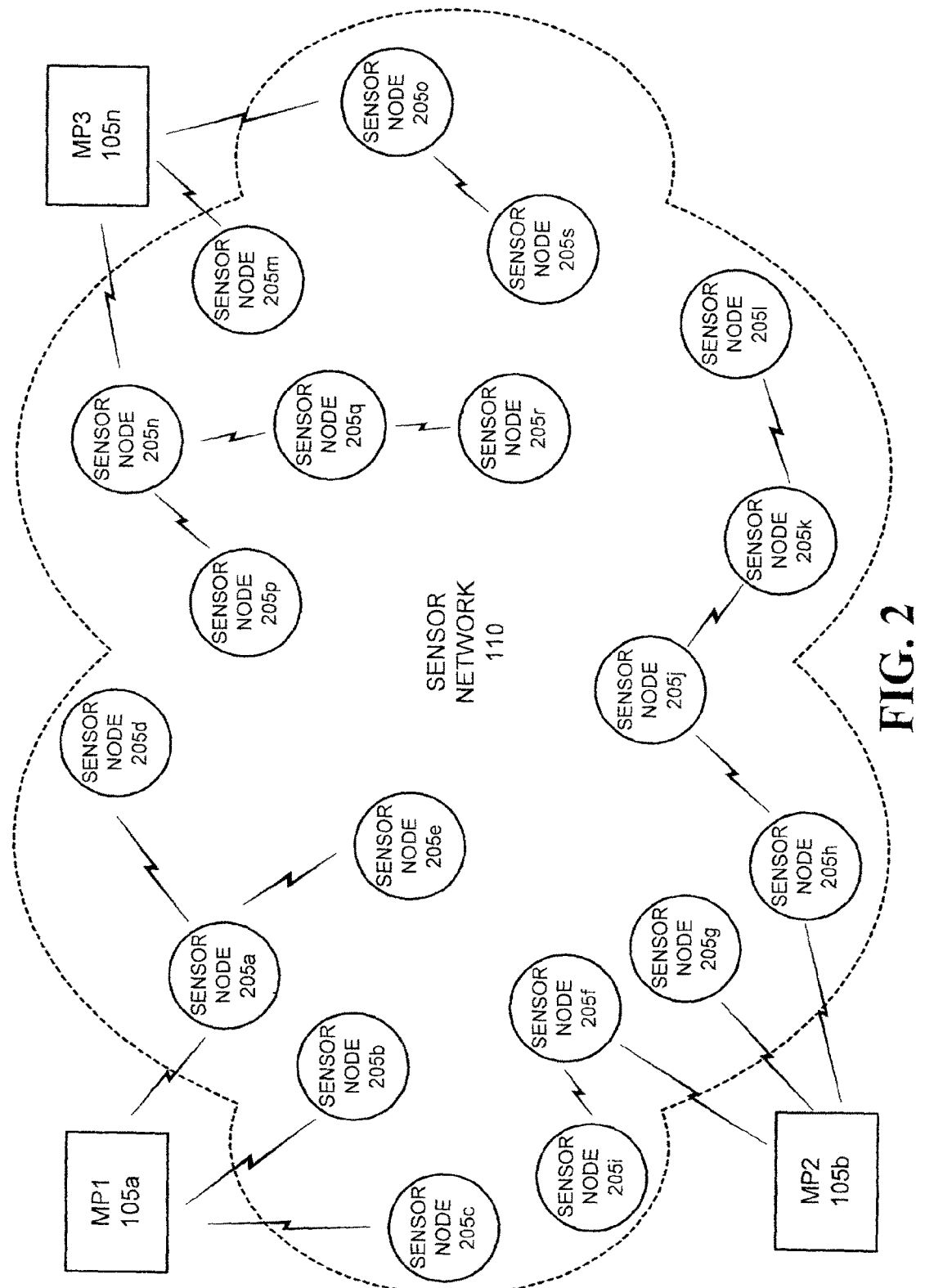
FIG. 2 illustrates an exemplary sensor network consistent with the present invention.

FIG. 2 illustrates an exemplary sensor network 110 consistent with the present invention. Sensor network 110 may include one or more sensor nodes 205a-205s that may be distributed across a geographic area. Sensor nodes 205a-205s may communicate with one another, and with one or more monitor points 105a-105n, via wireless or wire-line links (not shown), using, for example, packet-switching mechanisms. Using techniques such as those described in co-pending patent application Ser. No. 09/999,353, entitled "Systems and Methods for Scalable Routing in Ad-Hoc Wireless Sensor Networks" and filed Nov. 15, 2001 (the disclosure of which is incorporated by reference herein), sensor nodes 205a-205s may organize themselves into an ad-hoc, multi-hop wireless network through the communication of routing messages and message datagrams.

Figure 3:
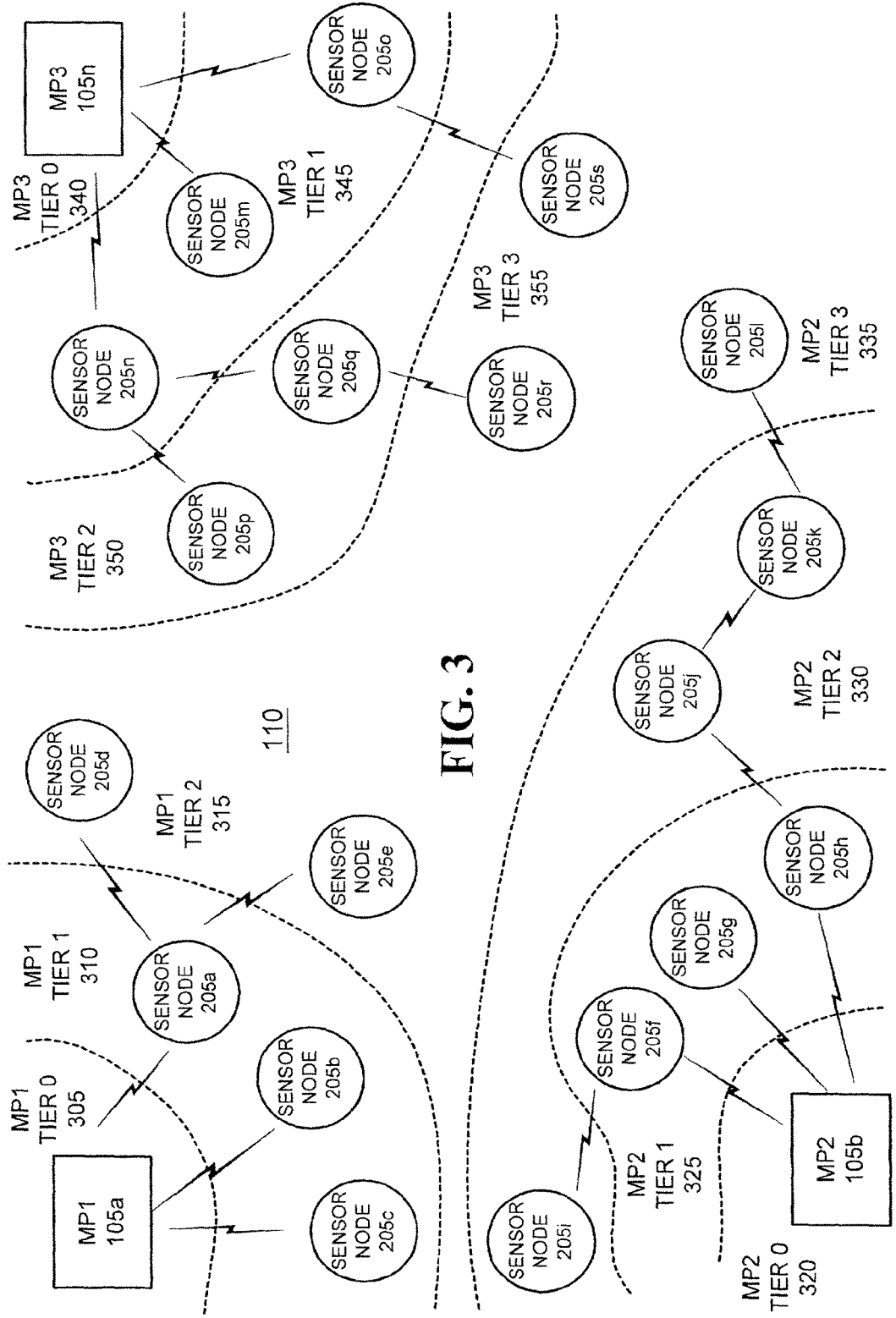
FIG. 3 illustrates the exemplary sensor network of FIG. 2 organized into tiers consistent with the present invention.

FIG. 3 illustrates sensor network 110 self-organized into tiers using conventional routing protocols, or the routing protocol described in the above-described co-pending patent application Ser. No. 09/999,353. When organized into tiers, messages may be forwarded, hop by hop through the network, from monitor points to sensor nodes, or from individual sensor nodes to monitor points that act as "sinks" for nearby sensor nodes. As shown in the exemplary network configuration illustrated in FIG. 3, monitor point MP1 105a may act as a "sink" for message datagrams from sensor nodes 205a-205e, monitor point MP2 105b may act as a "sink" for message datagrams from sensor nodes 205f-205l, and monitor point MP3 105n may act as a "sink" for message datagrams from sensor nodes 205m-205s.

As further shown in FIG. 3, monitor point MP1 105a may reside in MP1 tier 0 305, sensor nodes 205a-205c may reside in MP1 tier 1 310, and sensor nodes 205d-205e may reside in MP1 tier 2 315. Monitor point MP2 105b may reside in MP2 tier 0 320, sensor nodes 205f-205h may reside in MP2 tier 1 325, sensor nodes 205i-205k may reside in MP2 tier 2 330 and sensor node 205l may reside in MP2 tier 3 335. Monitor point MP3 105n may reside in MP3 tier 0 340, sensor nodes 205m-205o may reside in MP3 tier 1 345, sensor nodes 205p-205q may reside in MP3 tier 2 350 and sensor nodes 205r-205s may reside in MP3 tier 3 355. Each tier shown in FIG. 3 represents an additional hop that data must traverse when traveling from a sensor node to a monitor point, or from a monitor point to a sensor node. At least one node in any tier may act as a "parent" for nodes in the next higher tier (e.g., MP1 Tier 2 315). Thus, for example, sensor node 205a acts as a "parent" node for sensor nodes 205d-205e. Sensor nodes 205d-205e may relay all messages through sensor node 205a to reach monitor point MP1 105a.

Exemplary Sensor Node

Figure 4:
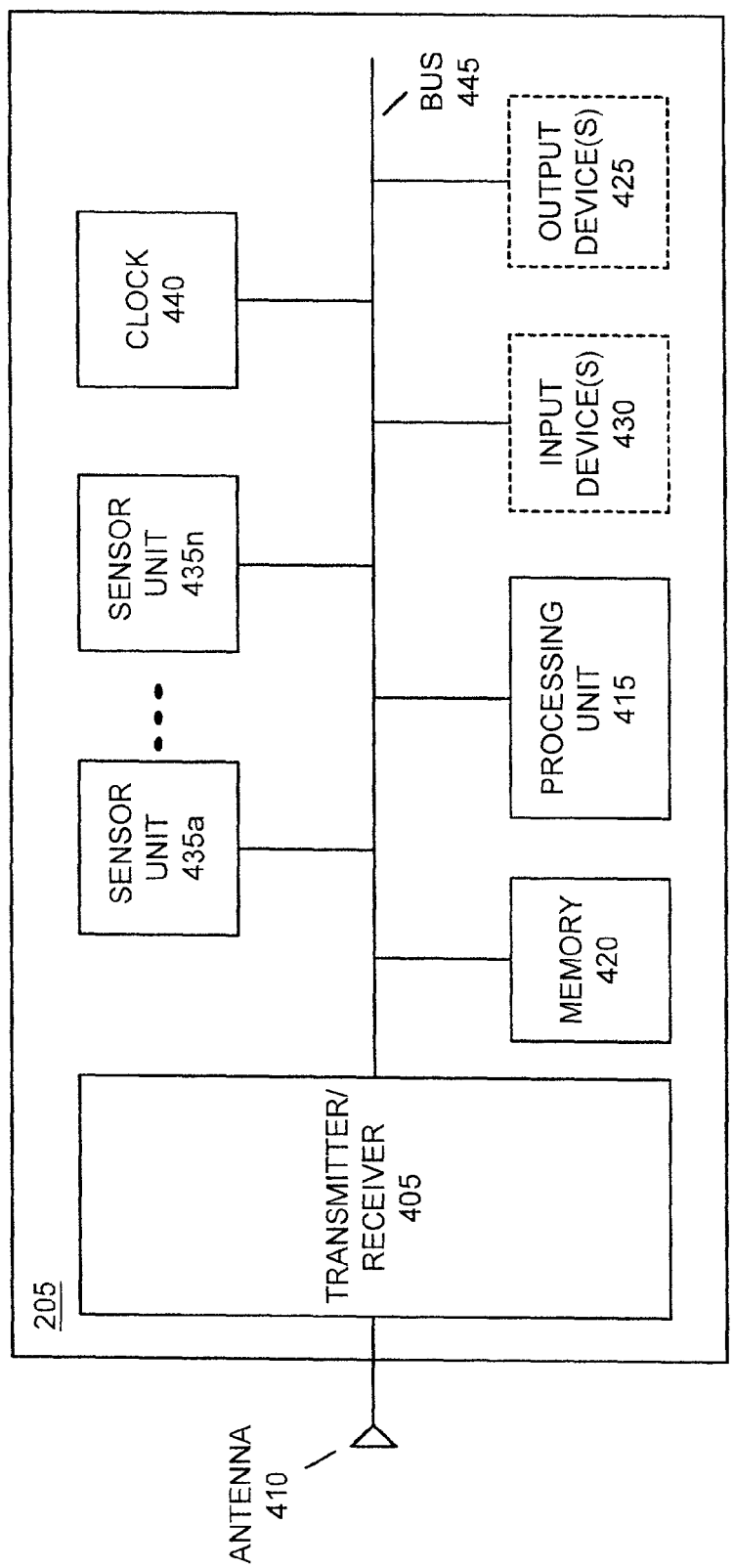
FIG. 4 illustrates exemplary components of a sensor node consistent with the present invention.

FIG. 4 illustrates exemplary components of a sensor node 205 consistent with the present invention. Sensor node 205 may include a transmitter/receiver 405, an antenna 410, a processing unit 415, a memory 420, an optional output device(s) 425, an optional input device(s) 430, one or more sensor units 435a-435n, a clock 440, and a bus 445.

Transmitter/receiver 405 may connect sensor node 205 to a monitor point 105 or another sensor node. For example, transmitter/receiver 405 may include transmitter and receiver circuitry well known to one skilled in the art for transmitting and/or receiving data bursts via antenna 410.

Processing unit 415 may perform all data processing functions for inputting, outputting and processing of data including data buffering and sensor node control functions. Memory 420 may include random access memory (RAM) and/or read only memory (ROM) that provides permanent, semi-permanent, or temporary working storage of data and instructions for use by processing unit 415 in performing processing functions. Memory 420 may also include large-capacity storage devices, such as magnetic and/or optical recording devices. Output device(s) 425 may include conventional mechanisms for outputting data in video, audio and/or hard copy format. For example, output device(s) 425 may include a conventional display for displaying sensor measurement data. Input device(s) 430 may permit entry of data into sensor node 205. Input device(s) 430 may include, for example, a touch pad or keyboard.

Sensor units 435a-435n may include one or more of any type of conventional sensing device, such as, for example, acoustic sensors, motion-detection sensors, radar sensors, sensors that detect specific chemicals or families of chemicals, sensors that detect nuclear radiation or sensors that detect biological agents such as anthrax. Each sensor unit 435a-435n may perform one or more measurements over a sampling period and transmit the measured values via packets, cells, datagrams, or the like to monitor points 105a-105n. Clock 440 may include conventional circuitry for maintaining a time base to enable the maintenance of a local time at sensor node 205. Alternatively, sensor node 205 may derive a local time from an external clock signal, such as, for example, a GPS signal, or from an internal clock synchronized to an external time base.

Bus 445 may interconnect the various components of sensor node 205 and permit them to communicate with one another.

Exemplary Monitor Point

Figure 5:
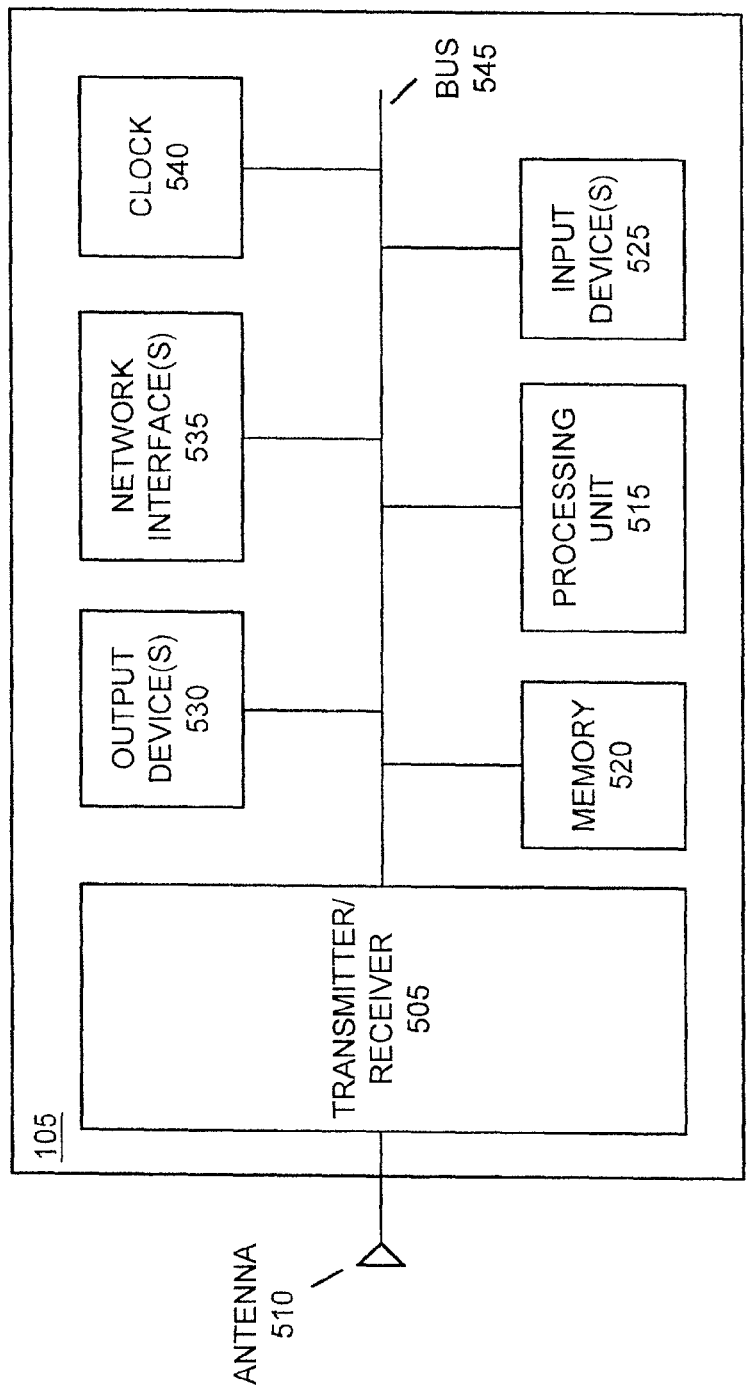
FIG. 5 illustrates exemplary components of a monitor point consistent with the present invention.

FIG. 5 illustrates exemplary components of a monitor point 105 consistent with the present invention. Monitor point 105 may include a transmitter/receiver 505, an antenna 510, a processing unit 515, a memory 520, an input device(s) 525, an output device(s) 530, network interface(s) 535, a clock 540, and a bus 545.

Transmitter/receiver 505 may connect monitor point 105 to another device, such as another monitor point or one or more sensor nodes. For example, transmitter/receiver 505 may include transmitter and receiver circuitry well known to one skilled in the art for transmitting and/or receiving data bursts via antenna 510.

Processing unit 515 may perform all data processing functions for inputting, outputting, and processing of data. Memory 520 may include Random Access Memory (RAM) that provides temporary working storage of data and instructions for use by processing unit 515 in performing processing functions. Memory 520 may additionally include Read Only Memory (ROM) that provides permanent or semi-permanent storage of data and instructions for use by processing unit 515. Memory 520 can also include large-capacity storage devices, such as a magnetic and/or optical device.

Input device(s) 525 permits entry of data into monitor point 105 and may include a user interface (not shown). Output device(s) 530 permits the output of data in video, audio, or hard copy format. Network interface(s) 535 interconnects monitor point 105 with network 115. Clock 540 may include conventional circuitry for maintaining a time base to enable the maintenance of a local time at monitor point 105. Alternatively, monitor point 105 may derive a local time from an external clock signal, such as, for example, a GPS signal, or from an internal clock synchronized to an external time base.

Bus 545 interconnects the various components of monitor point 105 to permit the components to communicate with one another.

Exemplary Monitor Point Database

Figure 6A:
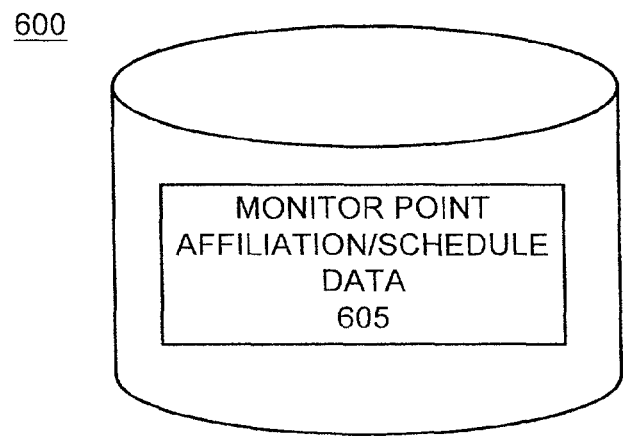
FIG. 6A illustrates an exemplary monitor point database consistent with the present invention.
Figure 6B:
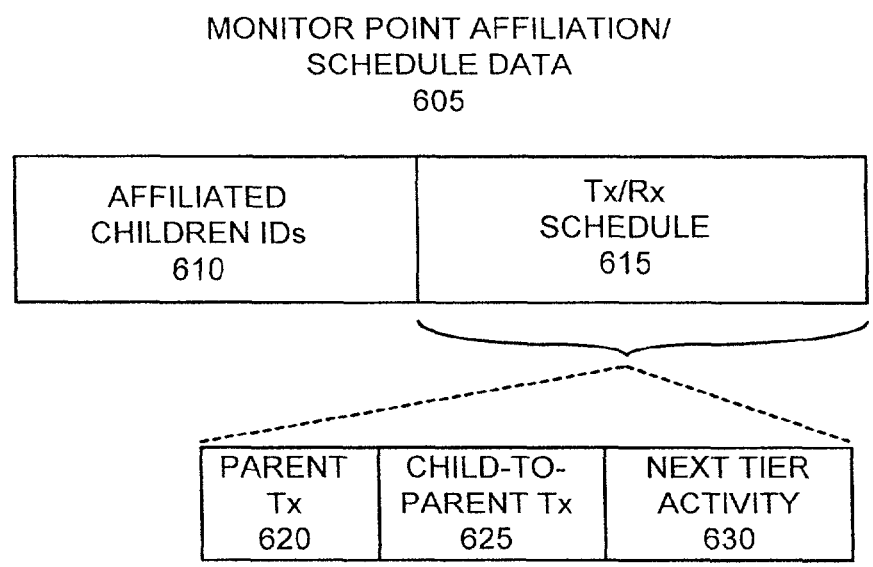
FIG. 6B illustrates exemplary monitor point affiliation/schedule data stored in the database of FIG. 6A consistent with the present invention.

FIG. 6A illustrates an exemplary database 600 that may be stored in memory 520 of a monitor point 105. Database 600 may include monitor point affiliation/schedule data 605 that includes identifiers of sensor nodes affiliated with monitor point 105, and scheduling data indicating times at which monitor point 105 may transmit to, or receive bursts of data from, affiliated sensor nodes. FIG. 6B illustrates exemplary data that may be contained in monitor point affiliation/schedule data 605. Monitor point affiliation/schedule data 605 may include "affiliated children IDs" data 610 and "Tx/Rx schedule" data 615. "Tx/Rx schedule" data 615 may further include "parent Tx" 620 data, "child-to-parent Tx" data 625, and "next tier activity" data 630.

"Affiliated children IDs" data 610 may include unique identifiers of sensor nodes 205 that are affiliated with monitor point 105 and, thus, from which monitor point 105 may receive messages. "Parent Tx" data 620 may include a time at which monitor point 105 may transmit messages to sensor nodes identified by the "affiliated children IDs" data 610. "Child-to-Parent Tx" data 625 may include times at which sensor nodes identified by "affiliated children IDs" 610 may transmit messages to monitor point 105. "Next Tier Activity" data 630 may include times at which sensor nodes identified by the "affiliated children IDs" data 610 may transmit messages to, and receive messages from, their affiliated children.

Exemplary Sensor Node Database

Figure 7A:
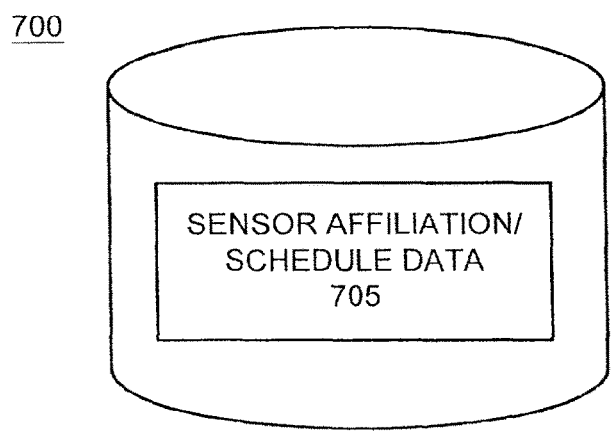
FIG. 7A illustrates an exemplary sensor node database consistent with the present invention.

FIG. 7A illustrates an exemplary database 700 that may be stored in memory 420 of a sensor node 205. Database 700 may include sensor affiliation/schedule data 705 that may further include data indicating which sensor nodes are affiliated with sensor node 205 and indicating schedules for sensor node 205 to transmit and receive messages.

Figure 7B:
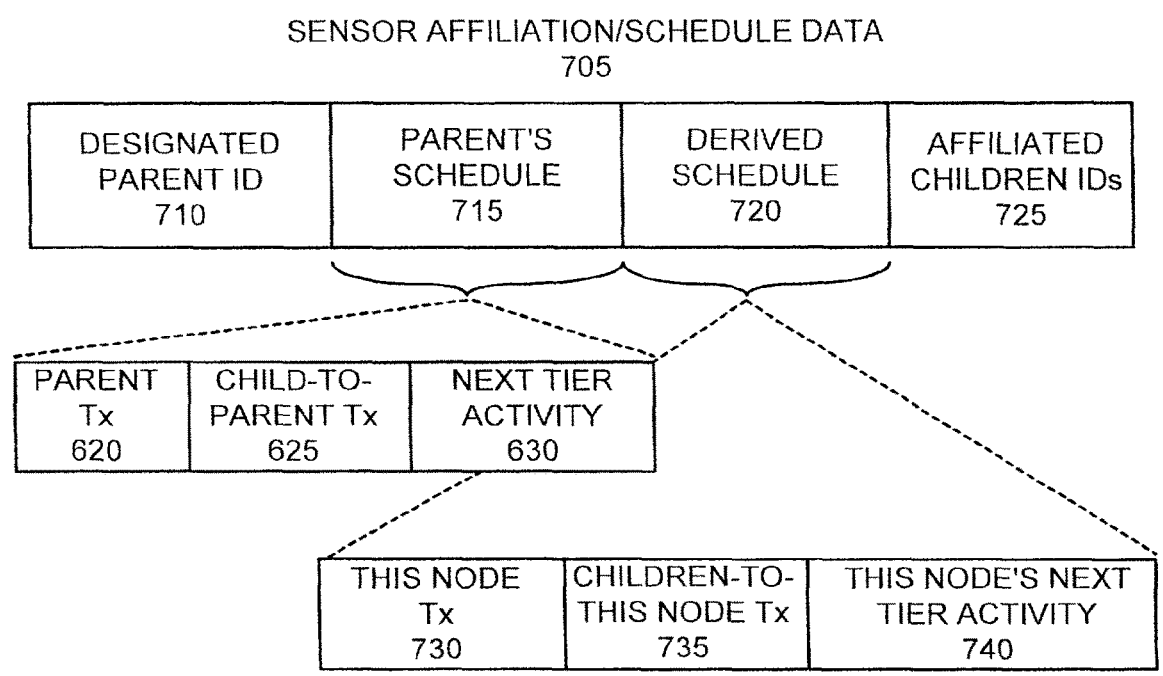
FIG. 7B illustrates exemplary sensor node affiliation/schedule data stored in the database of FIG. 7A consistent with the present invention.

FIG. 7B illustrates exemplary sensor affiliation/schedule data 705. Sensor affiliation/schedule data 705 may include "designated parent ID" data 710, "parent's schedule" data 715, "derived schedule" data 720, and "affiliated children IDs" data 725. "Designated parent ID" data 710 may include a unique identifier that identifies the "parent" node, in a lower tier of sensor network 110, to which sensor node 205 forwards messages. "Parent's schedule" data 715 may further include "parent Tx" data 620, "child-to-parent Tx" data 625 and "next tier activity" data 630. "Derived schedule" data 720 may further include "this node Tx" data 730, "children-to-this node Tx" data 735, and "this node's next tier activity" data 740. "This node Tx" data 730 may indicate a time at which sensor node 205 forwards messages to sensor nodes identified by "affiliated children IDs" data 725. "Children-to-this node Tx" data 735 may indicate times at which sensor nodes identified by "affiliated children IDs" data 725 may forward messages to sensor node 205. "This node's next tier activity" 740 may indicate one or more time periods allocated to sensor nodes in the next higher tier for transmitting and receiving messages.

Exemplary Schedule Message

Figure 8:
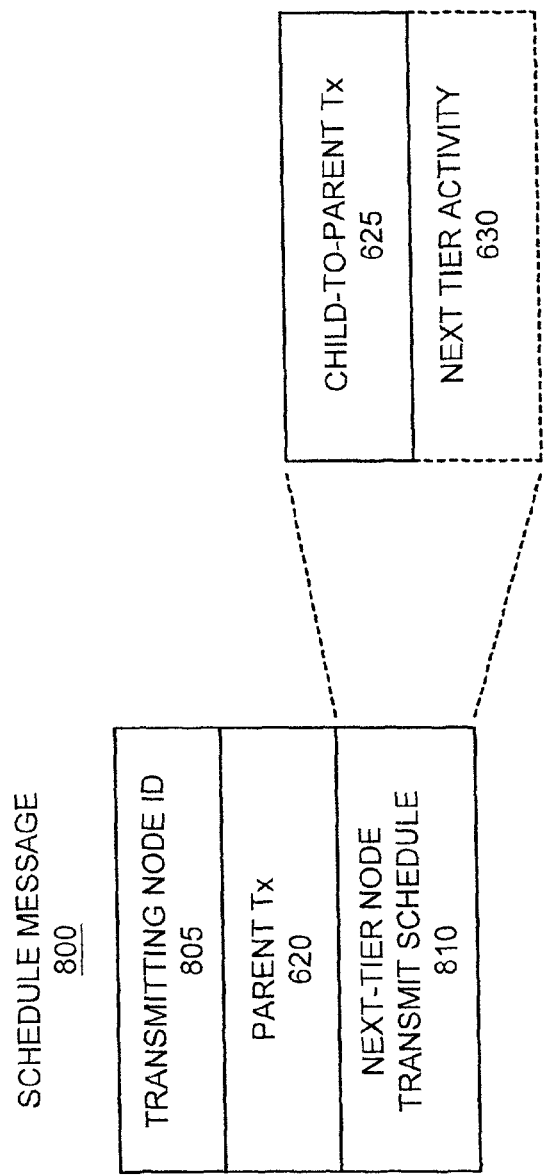
FIG. 8 illustrates an exemplary schedule message consistent with the present invention.

FIG. 8 illustrates an exemplary schedule message 800 that may be transmitted from a monitor point 105 or sensor node 205 for scheduling message transmit and receive times within sensor network 110. Schedule message 800 may include a number of data fields, including "transmitting node ID" data 805, "parent Tx" data 620, and "next-tier node transmit schedule" data 810. "Next-tier node transmit schedule" 810 may further include "child-to-parent Tx" data 625 and "next tier activity" data 630. "Transmitting node ID" data 805 may include a unique identifier of the monitor point 105 or sensor node 205 originating the schedule message 800.

Exemplary Transmit/Receive Scheduling

Figure 9:
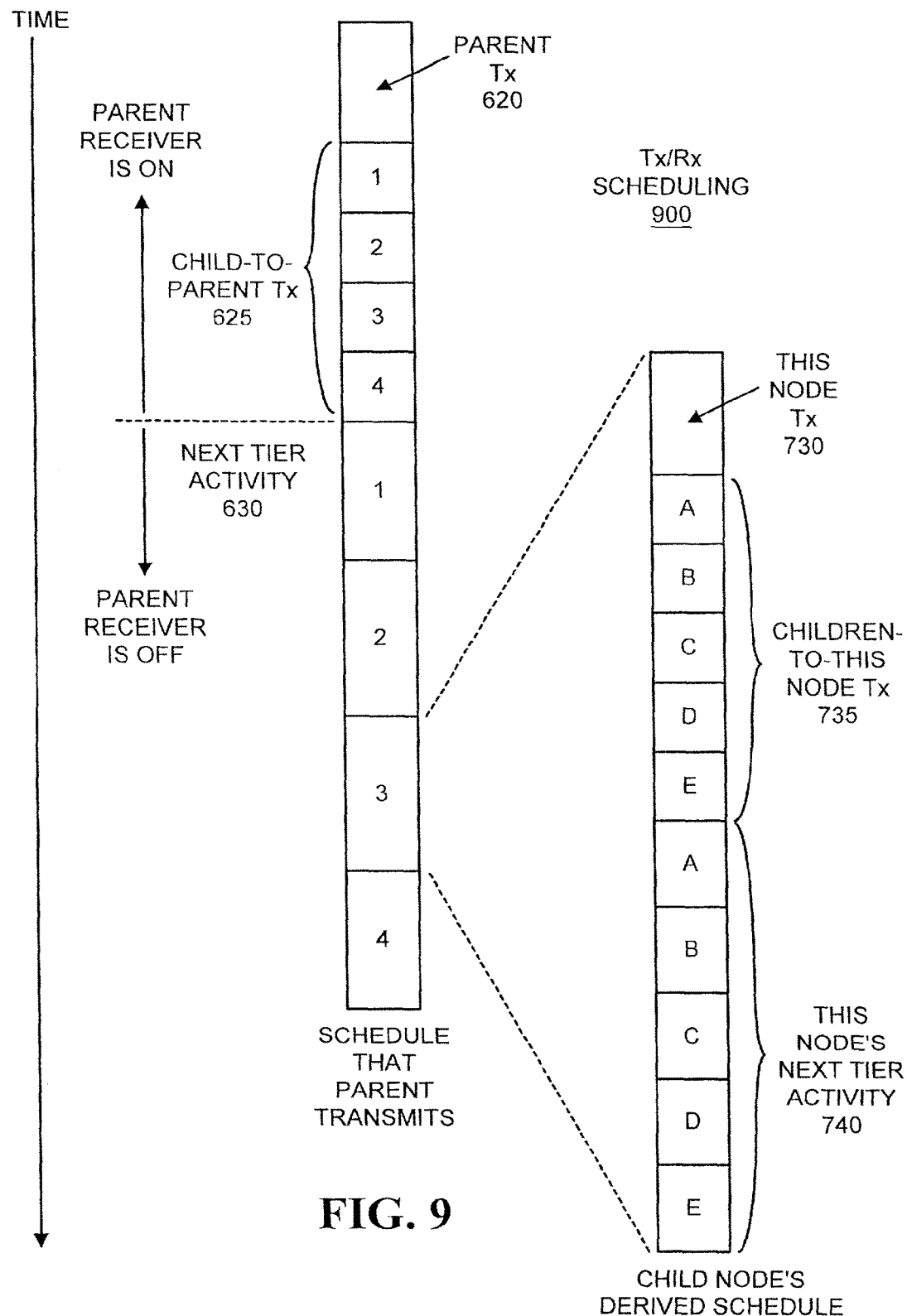
FIG. 9 illustrates exemplary transmit/receive scheduling consistent with the present invention.

FIG. 9 illustrates exemplary transmit/receive scheduling that may be employed at each sensor node 205 of network 110 according to schedule messages 800 received from "parent" nodes in a lower tier. The first time period shown on the scheduling timeline, Parent Tx time 620, may include the time period allocated by a "parent" node for transmitting messages from the "parent" node to its affiliated children. The time periods "child-to-parent Tx" 625 may include time periods allocated to each affiliated child of a parent node for transmitting messages to the parent node. During the "child-to-parent Tx" 625 time periods, the receiver of the parent node may be turned on to receive messages from the affiliated children.

The "next tier activity" 630 may include time periods allocated to each child of a parent node for transmitting messages to, and receiving messages from, each child's own children nodes. From the time periods allocated to the children of a parent node, each child may construct its own derived schedule. This derived schedule may include a time period, "this node Tx" 730 during which the child node may transmit to its own affiliated children. The derived schedule may further include time periods, "children-to-this node Tx" 735 during which these affiliated children may transmit messages to the parent's child node. The derived schedule may additionally include time periods, designated "this node's next tier activity" 740, that may be allocated to this node's children so that they may, in turn, construct their own derived schedule for their own affiliated children.

Exemplary Parent/Child Affiliation Processing

Figure 10:
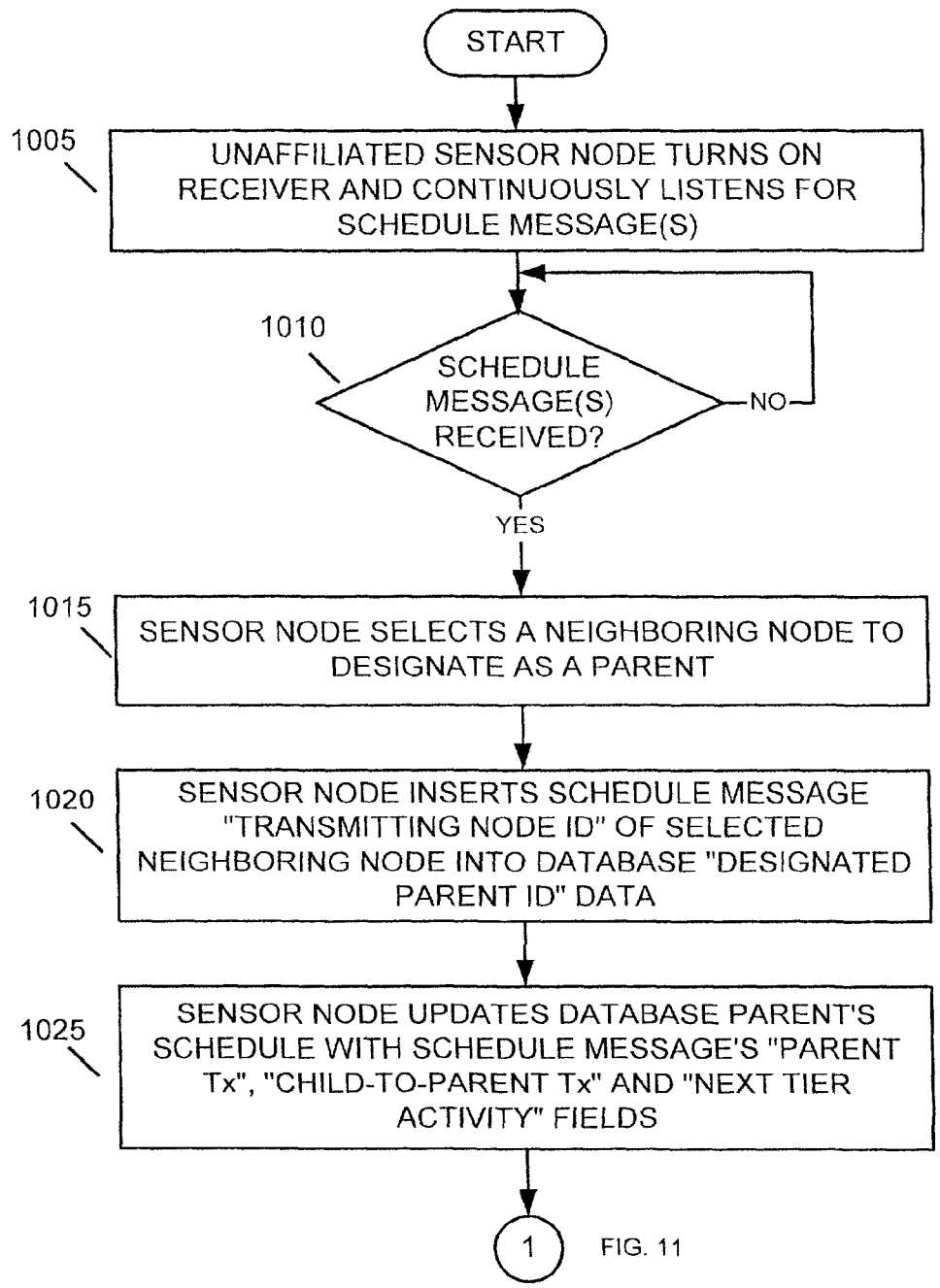
FIGS. 10-11 are flowcharts that illustrate parent/child affiliation processing consistent with the present invention.
Figure 11:
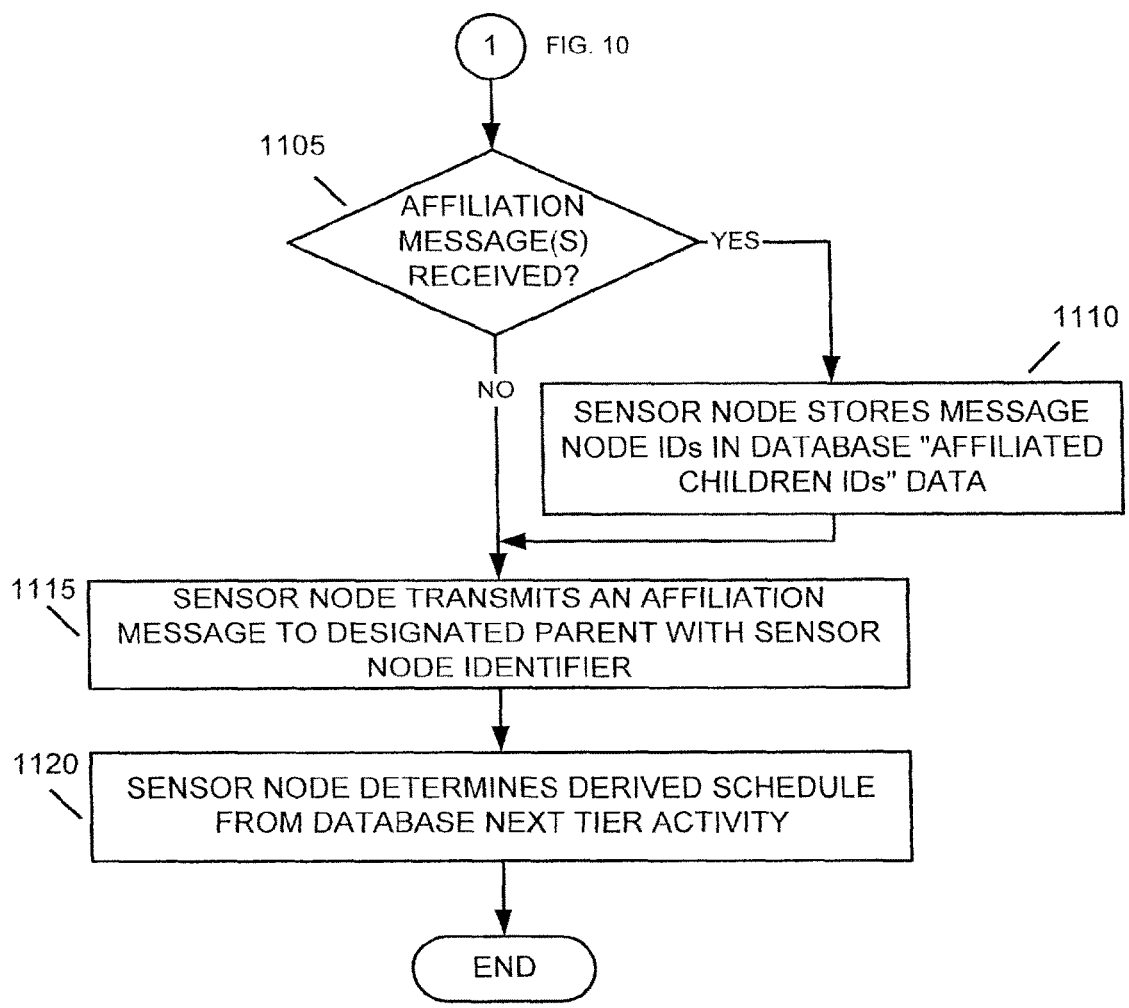

FIGS. 10-11 are flowcharts that illustrate exemplary processing, consistent with the present invention, for affiliating "child" sensor nodes 205 with "parent" nodes in a lower tier. Such "parent" nodes may include other sensor nodes 205 in sensor network 110 or monitor points 105. As one skilled in the art will appreciate, the method exemplified by FIGS. 10 and 11 can be implemented as a sequence of instructions and stored in memory 420 of sensor node 205 for execution by processing unit 415.

An unaffiliated sensor node 205 may begin parent/child affiliation processing by turning on its receiver 405 and continuously listening for schedule message(s) transmitted from a lower tier of sensor network 110 [step 1005] (FIG. 10). Sensor node 205 may be unaffiliated with any "parent" node if it has recently been powered on. Sensor node 205 may also be unaffiliated if it has stopped receiving schedule messages from its "parent" node for a specified time period. If one or more schedule messages are received [step 1010], unaffiliated sensor node 205 may select a neighboring node to designate as a parent [step 1015]. For example, sensor node 205 may select a neighboring node whose transmit signal has the greatest strength or the least bit error rate (BER). Sensor node 205 may insert the "transmitting node ID" data 805 from the corresponding schedule message 800 of the selected neighboring node into the "designated parent ID" data 710 of database 700 [step 1020]. Sensor node 205 may then update database 700's "parent's schedule" data 715 with "parent Tx" data 620, "child-to-parent Tx" data 625, and "next tier activity" data 630 from the corresponding schedule message 800 of the selected neighboring node [step 1025].

Sensor node 205 may determine if any affiliation messages have been received from sensor nodes residing in higher tiers [step 1105] (FIG. 11). If so, sensor node 205 may store message node identifiers contained in the affiliation messages in database 700's "affiliation children IDs" data 725 [step 1110]. Sensor node 205 may also transmit an affiliation message to the node identified by "designated parent ID" data 710 in database 700 [step 1115]. Sensor node 205 may further determine a derived schedule from the "next tier activity" data 630 in database 700 [step 1120] and store in the "derived schedule" data 720.

Exemplary Monitor Point Message Processing

Figure 12:
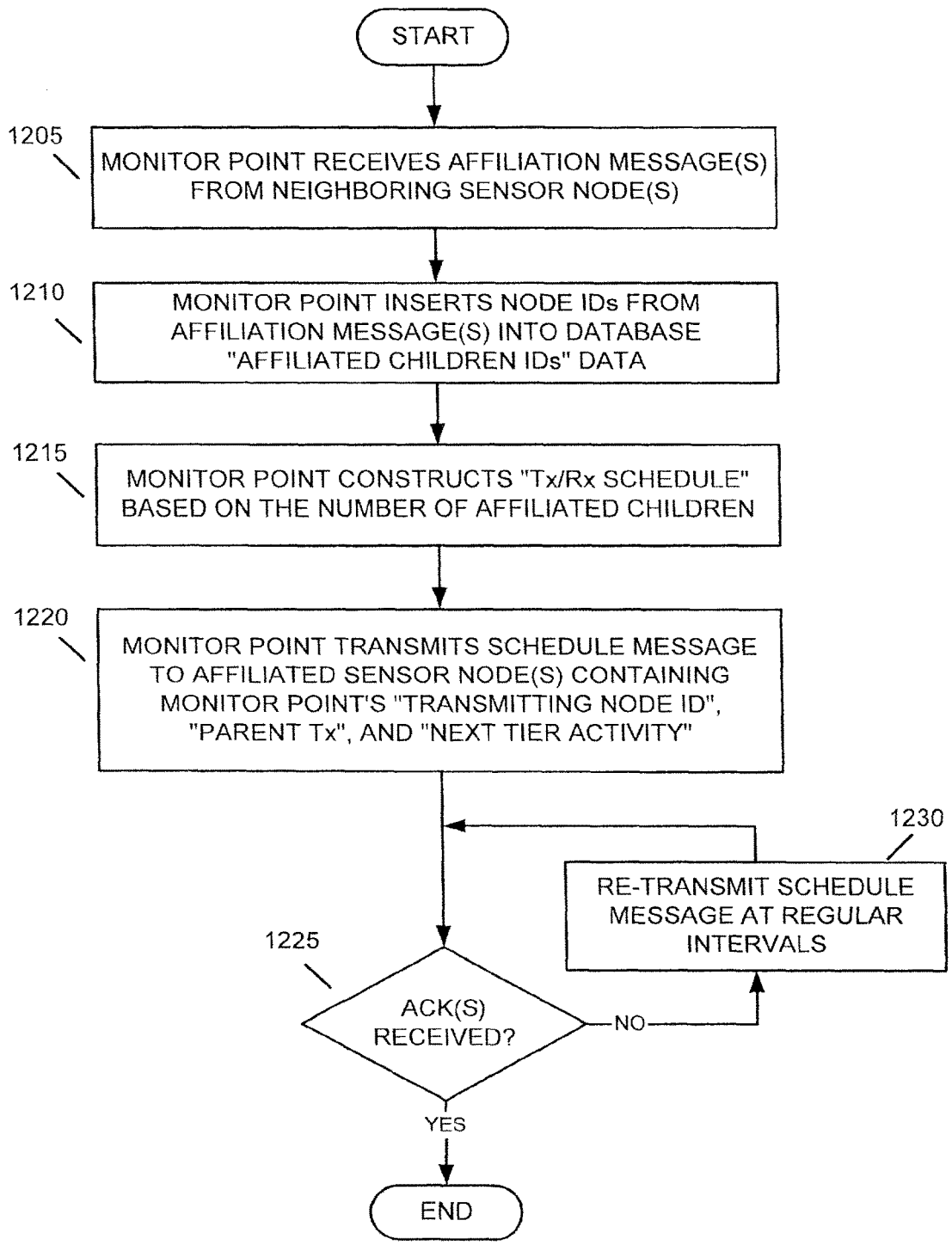
FIG. 12 is a flowchart that illustrates exemplary monitor point scheduling processing consistent with the present invention.
Figure 13:
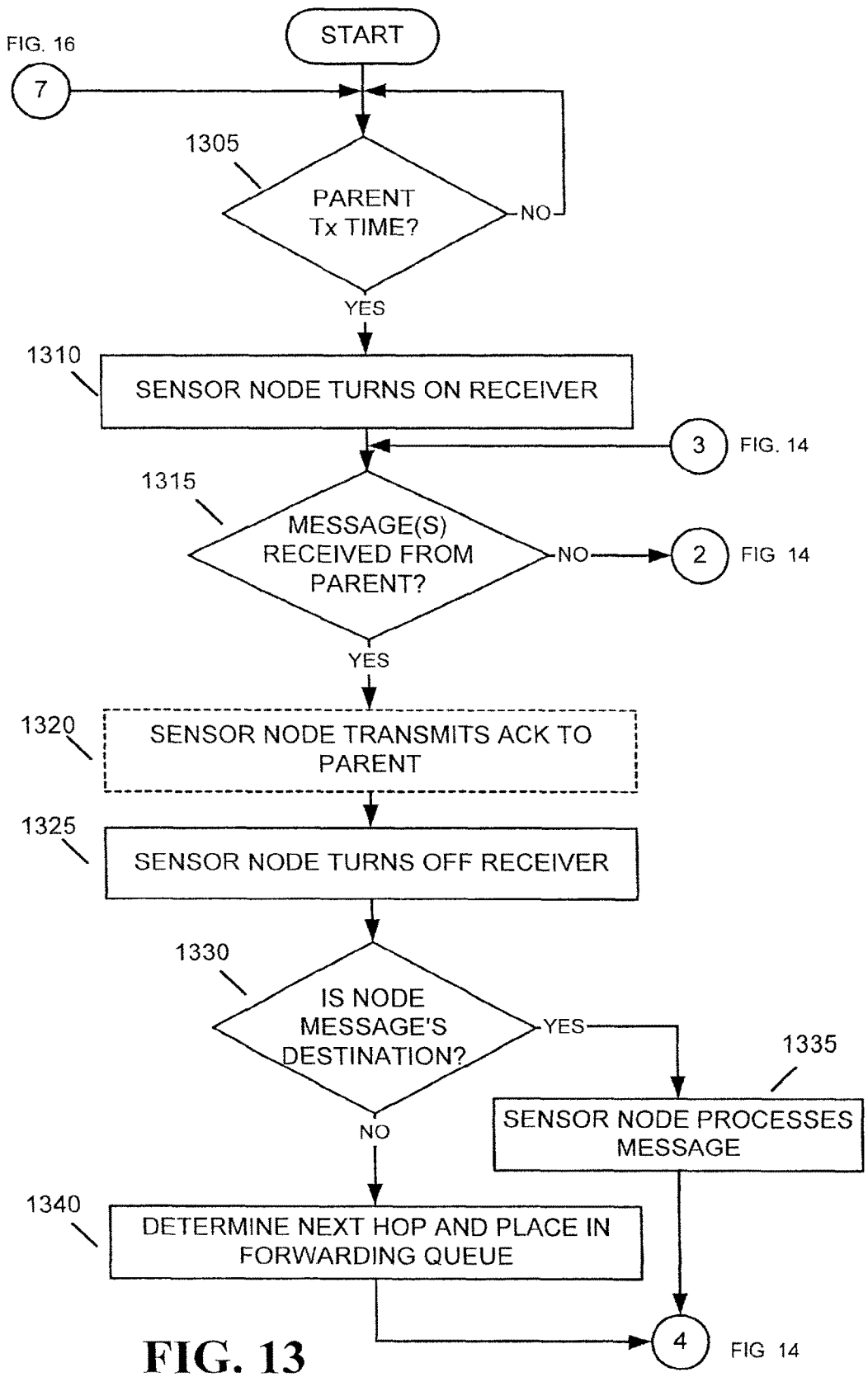
FIGS. 13-16 are flowcharts that illustrate sensor node schedule message processing consistent with the present invention.

FIG. 12 is a flowchart that illustrates exemplary processing, consistent with the present invention, for receiving affiliation messages and transmitting schedule messages at a monitor point 105. As one skilled in the art will appreciate, the method exemplified by FIG. 12 can be implemented as a sequence of instructions and stored in memory 520 of monitor point 105 for execution by processing unit 515.

Monitor point message processing may begin with a monitor point 105 receiving one or more affiliation messages from neighboring sensor nodes [step 1205] (FIG. 12). Monitor point 105 may insert the node identifiers from the received affiliation message(s) into database 600's "affiliation children IDs" data 610 [step 1210]. Monitor point 105 may construct the "Tx/Rx schedule" 615 based on the number of affiliated children indicated in "affiliated children IDs" data 610 [step 1215]. Monitor point 105 may then transmit a schedule message 800 to sensor nodes identified by "affiliated children IDs" data 610 containing monitor point 105's "transmitting node ID" data 805, "parent Tx" data 620, and "next-tier transmit schedule" data 810 [step 1220]. Schedule message 800 may be transmitted periodically using conventional multiple access mechanisms, such as, for example, Carrier Sense Multiple Access (CSMA). Subsequent to transmission of schedule message 800, monitor point 105 may determine if acknowledgements (ACKs) have been received from all affiliated children [step 1225]. If not, monitor point 105 may re-transmit the schedule message 800 at regular intervals until ACKs are received from all affiliated children [step 1230]. In this manner, monitor point 105 coordinates and schedules the power on/off intervals of the sensor nodes that is associated with (i.e., the nodes with which it transmits/receives data from).

Exemplary Message Reception/Transmission Processing

FIGS. 13-16 are flowcharts that illustrate exemplary processing, consistent with the present invention, for receiving and/or transmitting messages at a sensor node 205. As one skilled in the art will appreciate, the method exemplified by FIGS. 13-16 can be implemented as a sequence of instructions and stored in memory 420 of sensor node 205 for execution by processing unit 415. The exemplary reception and transmission of messages at a sensor node 205 as illustrated in FIGS. 13-16 is further demonstrated with respect to the exemplary messages transmission diagram illustrated in FIG. 17.

Figure 14:
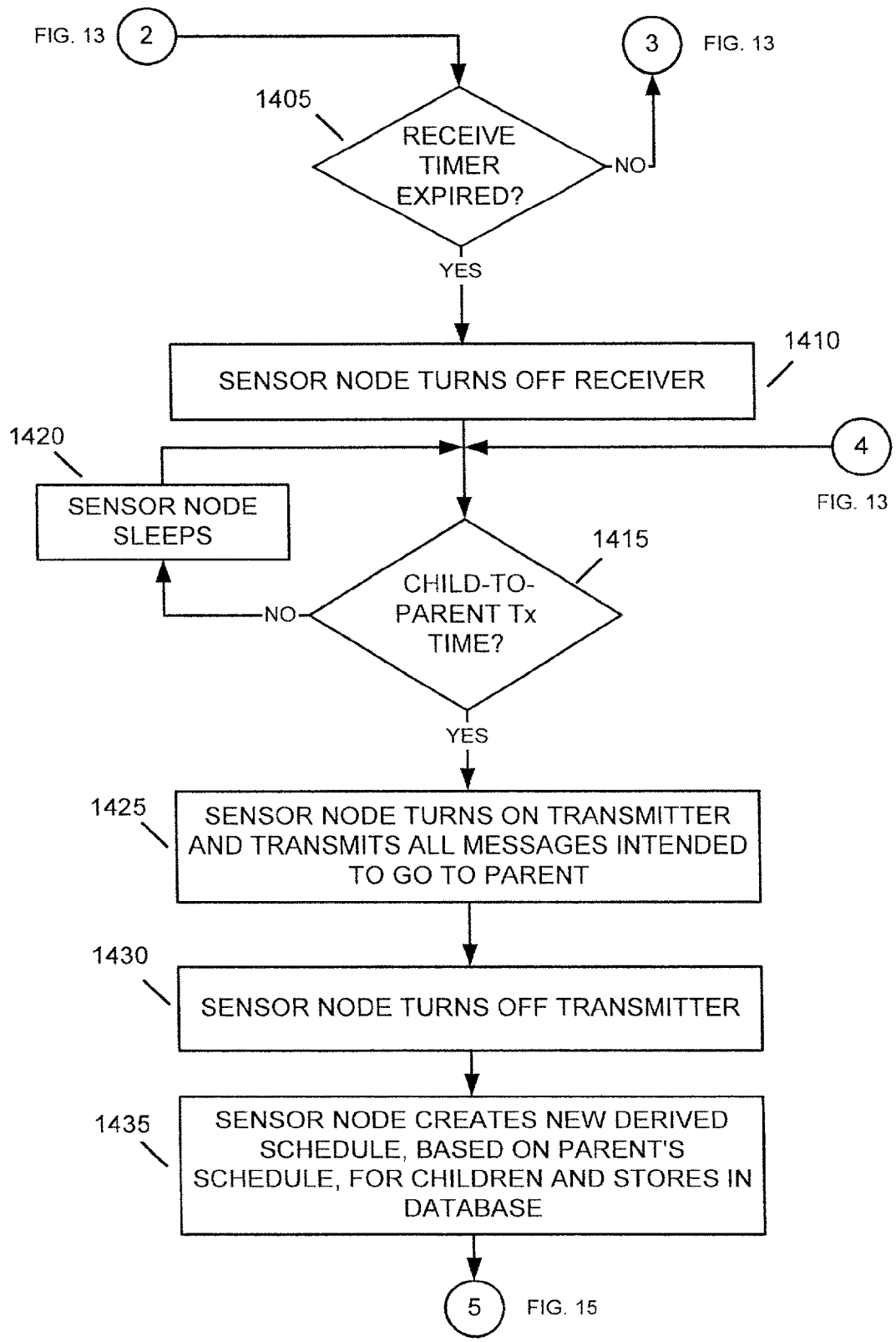

Sensor node 205 ("This node" 1710 of FIG. 17) may begin processing by determining if it is the next parent transmit time as indicated by clock 440 and the "parent Tx" data 620 of database 700 [step 1305]. If so, sensor node 205 may turn on receiver 405 [step 1310] (FIG. 13) and listen for messages transmitted from a parent (see also "Parent Node" 1705 of FIG. 17). If no messages are received, sensor node 205 determines if a receive timer has expired [step 1405] (FIG. 14). The receive timer may indicate a maximum time period that sensor node 205 (see "This Node" 1710 of FIG. 17) may listen for messages before turning off receiver 405. If the receive timer has not expired, processing may return to step 1315. If the receive timer has expired, sensor node 205 may turn off receiver 405 [step 1410]. If messages have been received (see "Parent TX" 620 of FIG. 17), sensor node 205 may, optionally, transmit an ACK to the parent node that transmitted the messages [step 1320]. Sensor node 205 may then turn off receiver 405 [step 1325].

Inspecting the received messages, sensor node 205 may determine if sensor node 205 is the destination of each of the received messages [step 1330]. If so, sensor node 205 may process the message [step 1335]. If not, sensor node 205 may determine a next hop in sensor network 110 for the message using conventional routing tables, and place the message in a forwarding queue [step 1340]. At step 1415, sensor node 205 may determine if it is time to transmit messages to the parent node as indicated by "child-to-parent Tx" data 625 of database 700 (see "child-to-parent Tx" 625 of FIG. 17). If not, sensor node 205 may sleep until clock 440 indicates that it is time to transmit messages to the parent node [step 1420]. If clock 440 and "child-to-parent Tx" data 625 indicate that it is time to transmit messages to the parent node, sensor node 205 may turn on transmitter 405 and transmit all messages intended to go to the node indicated by the "designated parent ID" data 710 of database 700 [step 1425]. After all messages are transmitted to the parent node, sensor node 205 may turn off transmitter 405 [step 1430].

Figure 15:
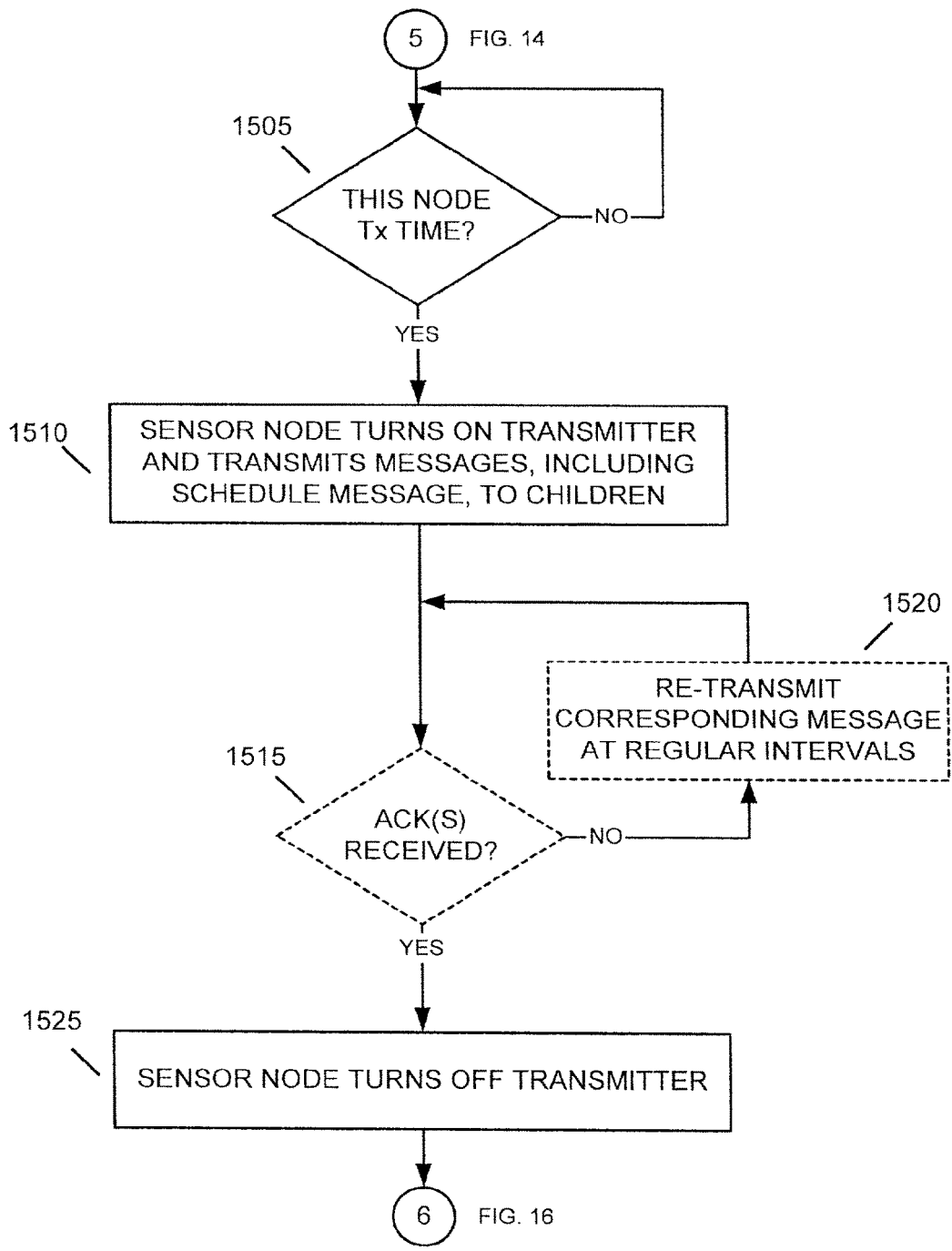
Figure 16:
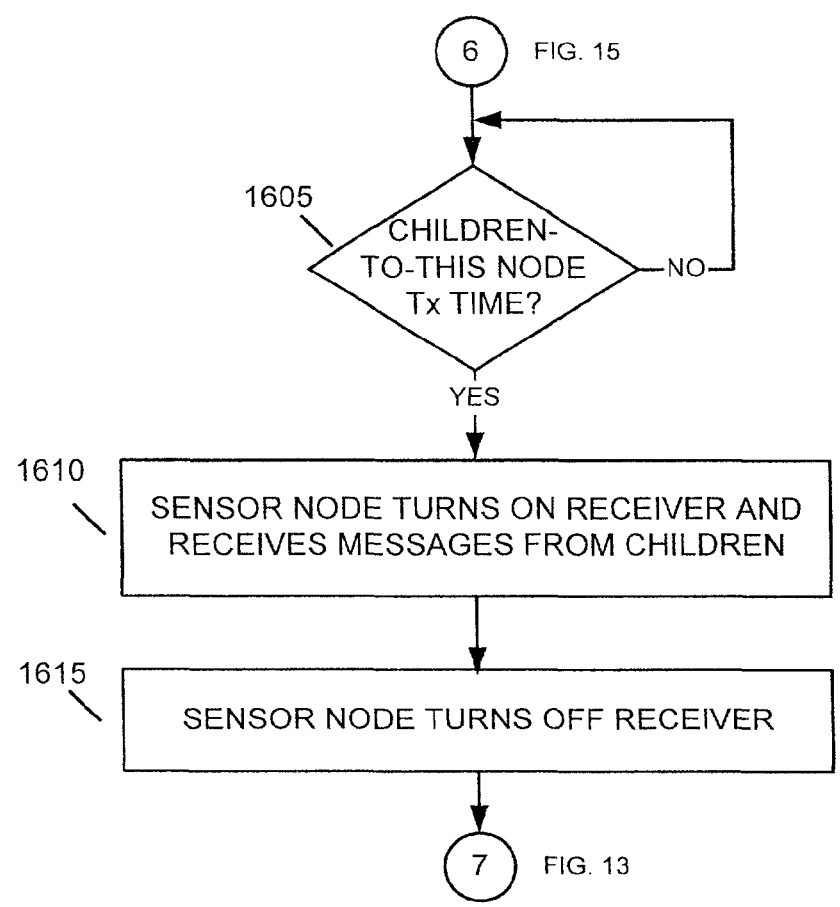
Figure 17:
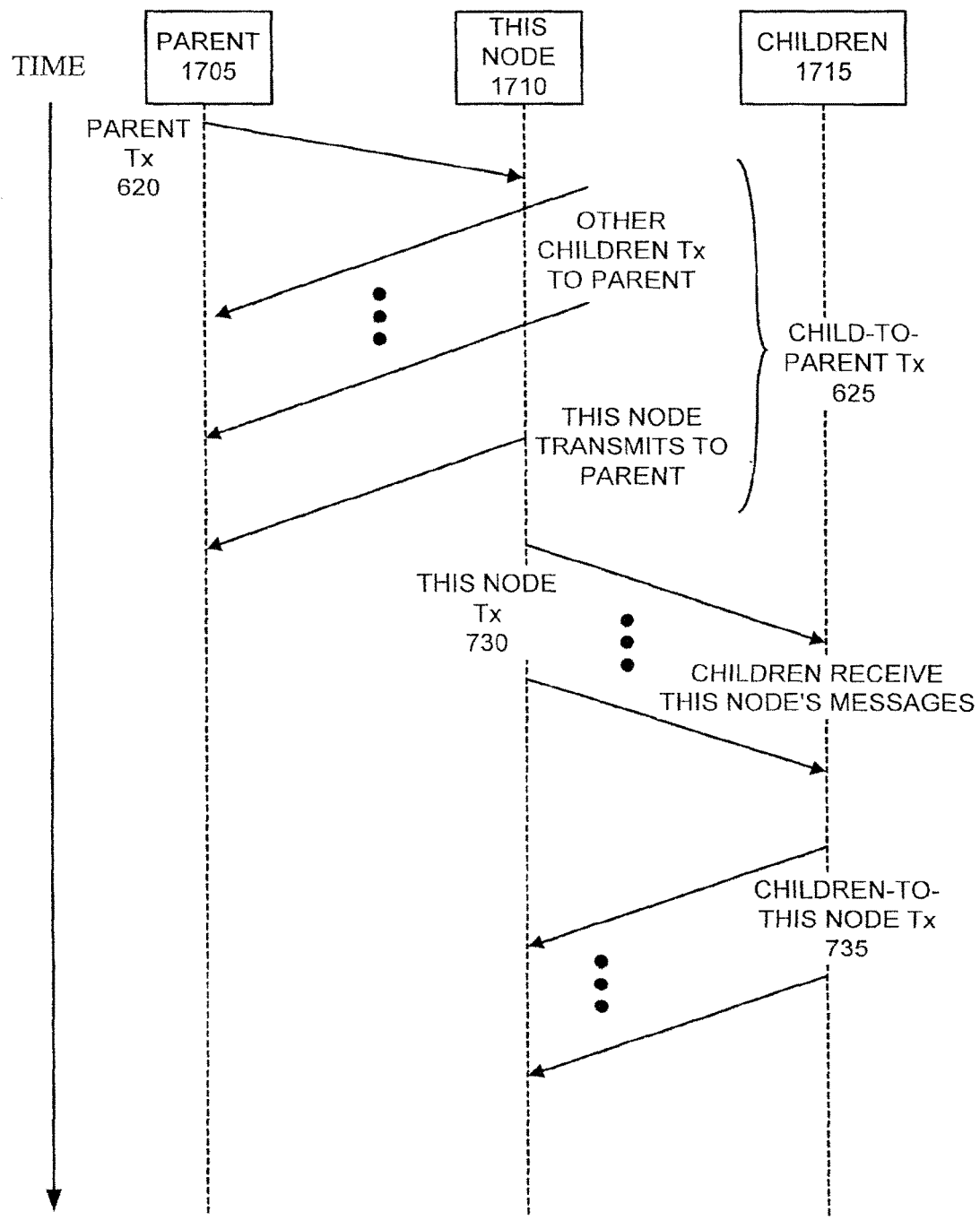
FIG. 17 illustrates an exemplary message transmission diagram consistent with the present invention.

Sensor node 205 may create a new derived schedule for it's children identified by "affiliated children IDs" data 725, based on the "parent's schedule" 715, and may then store the new derived schedule in the "derived schedule" data 720 of database 700 [step 1435]. Sensor node 205 may inspect the "this node Tx" data 730 of database 700 to determine if it is time to transmit to the sensor nodes identified by the "affiliated children IDs" data 725 [step 1505] (FIG. 15). If so, sensor node 205 may turn on transmitter 405 and transmit messages, including schedule messages, to its children [step 1510] (see "This Node Tx" 730, FIG. 17). For each transmitted message, sensor node 205 may, optionally, determine if an ACK is received [step 1515]. If not, sensor node 205 may further, optionally, re-transmit the corresponding message at a regular interval until an ACK is received [step 1520]. When all ACKs are received, sensor node 205 may turn off transmitter 405 [step 1525]. Sensor node 205 may then determine if it is time for its children to transmit to sensor node 205 as indicated by clock 440 and "children-to-this node Tx" data 735 of database 700 [step 1605] (FIG. 16). If so, sensor node 205 may turn on receiver 405 and receive one or messages from the children identified by the "affiliated children IDs" data 725 of database 700 [step 1610] (see "Children-to-this Node Tx" 735, FIG. 17). Sensor node 205 may then turn off receiver 405 [step 1615] and processing may return to step 1305 (FIG. 13). In this manner, sensor nodes may power on and off their transmitters and receivers at appropriate times to conserve energy, while still performing their intended functions in network 100.

Exemplary Receiver Timing

Figure 18:
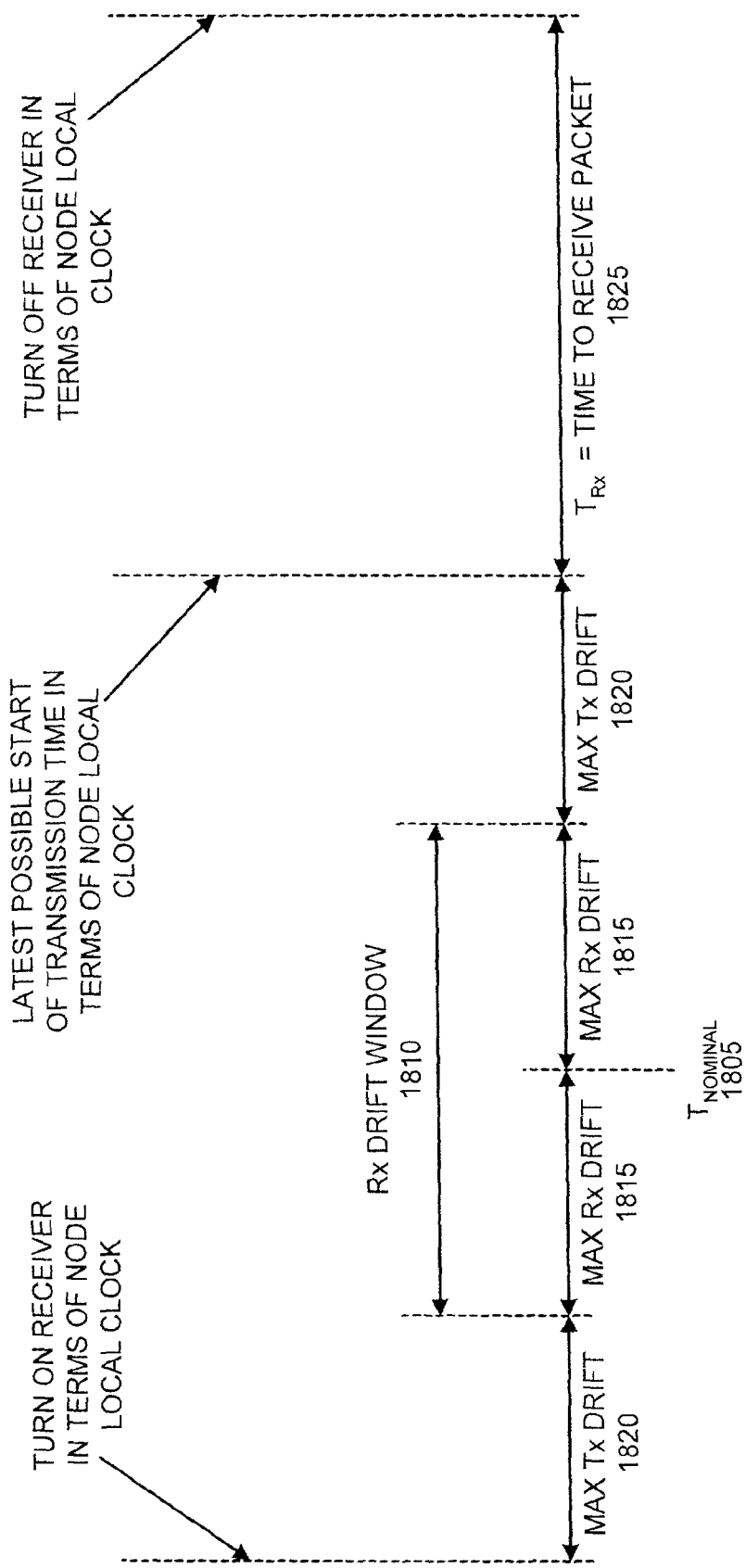
FIG. 18 illustrates exemplary node receiver timing consistent with the present invention.

FIG. 18 illustrates exemplary receiver timing when monitor points 105 or sensor nodes 205 of network 100 use internal clocks that may have inherent "clock drift." "Clock drift" occurs when internal clocks runs faster or slower then the true elapsed time and may be inherent in many types of internal clocks employed in monitor points 105 or sensor nodes 205. "Clock drift" may be taken into account when scheduling the time at which a node's receiver must be turned on, since both the transmitting node and the receiving node may both have drifting clocks. As shown in FIG. 18, $T_{nominal}$ 1805 represents the next time at which a receiver must be turned on based on scheduling data contained in the schedule message received from a parent node. A "Rx Drift Window" 1810 exists around this time which represents $T_{nominal}$ plus or minus the "Max Rx Drift" 1815 for this node over the amount of time remaining until $T_{nominal}$. If the transmitting node has zero clock drift, the receiving node should, thus, wake up at the beginning of its "Rx Drift Window" 1810.

The clock at the transmitting node may also incur clock drift, "Max Tx Drift" 1820, that must be accounted for at the receiving node when turning on and off the receiver. The receiving node should, thus, turn on its receiver at a local clock time that is "Max Tx Drift" 1820 plus "Max Rx Drift" 1815 before $T_{nominal}$. The receiving node should also turn off its receiver at a local clock time that is "Max Rx Drift" 1815 plus "Max Tx Drift" 1820 plus a maximum estimated time to receive a packet from the transmitting node (TRx 1825). TRx 1825 may include packet transmission time and packet propagation time. By taking into account maximum estimated clock drift at both the receiving node and transmitting node, monitor points 105 and sensor nodes 205 of sensor network 110 may successfully implement transmit/receive scheduling as described above with respect to FIGS. 1-17.

CONCLUSION

Systems and methods consistent with the present invention, therefore, provide mechanisms that enable sensor node transmitters and receivers to be turned off, and remain in a "sleep" state, for substantial periods, thus, increasing the energy efficiency of the nodes. Systems and methods consistent with the present invention further implement transmission and reception schedules that permit the reception and forwarding of packets containing routing, or other types of data, during short periods when the sensor node transmitters and receivers are powered up and, thus, "awake." The present invention, thus, increases sensor node operational life by reducing energy consumption while permitting the reception and forwarding of the routing messages needed to self-organize the distributed network.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other hardware/software configurations may be possible. Also, while series of steps have been described with regard to FIGS. 10-16, the order of the steps is not critical.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A wireless apparatus comprising:
a wireless transceiver, communicatively coupled with a processor within the wireless apparatus, the wireless transceiver configured to transmit and receive communications via a wireless network;
the processor configured to receive a first schedule definition and a second schedule definition from a networking device of the wireless network;
the processor further configured to determine, from the received first schedule definition and the received second schedule definition, downlink reception times;
the processor further configured to start a timer at one of the determined downlink reception times;
the processor further configured to determine, during a duration of the timer, whether a downlink transmission including a message is being communicated from the networking device to the wireless apparatus;
the processor further configured to discontinue reception at expiration of the timer;
the processor further configured, in response to reception of the downlink transmission, to transmit an acknowledgement and to discontinue reception before the timer has expired; and
the wireless transceiver further configured to adjust an uplink transmission time for a communication to the networking device based on a determined amount of time drift.

2. The wireless apparatus of claim 1, wherein the reception of the first and second schedule definitions comprises receipt in a plurality of time periods.

3. The wireless apparatus of claim 1 further comprising:
the processor further configured to affiliate with the networking device of the wireless network based on signal strength.

4. The wireless apparatus of claim 3, wherein the affiliation further comprises an assignment of an affiliation identifier to the wireless apparatus.

5. The wireless apparatus of claim 4, wherein the first or second schedule definition comprises a plurality of affiliation identifiers corresponding to a portion of a plurality of apparatuses.

6. The wireless apparatus of claim 1, wherein a portion of the wireless transceiver is powered down during a time period other than the determined downlink reception times.

7. The wireless apparatus of claim 6, wherein the powered down portion of the wireless transceiver is activated for the determined downlink reception times.

8. A method of communicating within a wireless network via a wireless apparatus, the method comprising:
receiving, by the wireless apparatus, a first schedule definition and a second schedule definition indicating downlink reception times;
starting, by the wireless apparatus, a timer at one of the indicated downlink reception times;
determining, by the wireless apparatus during a duration of the timer, whether a downlink transmission including a message is being communicated from a networking device to the wireless apparatus;
discontinuing, by the wireless apparatus, reception at expiration of the timer;
transmitting, by the wireless apparatus in response to receiving the downlink transmission, an acknowledgement and discontinuing reception before the timer has expired; and
adjusting, by the wireless apparatus, an uplink transmission time for a communication to the networking device based on a determined amount of time drift.

9. The method of claim 8, wherein the first and second schedule definitions are received from a networking device of the wireless network.

10. The method of claim 8, wherein, during a plurality of time periods which are not allocated to the wireless apparatus, a portion of the wireless apparatus is powered down for a period of time.

11. The method of claim 8, wherein the received first and second schedule definitions each include a first time period allocated for transmission and a second time period allocated for reception.

12. The method of claim 11, wherein the received first and second schedule definitions each further include a plurality of transmission and reception time periods corresponding to a plurality of other wireless apparatuses.

13. The method of claim 12 further comprising:
affiliating, by the wireless apparatus, with a networking device of the wireless network.

14. The method of claim 13 further comprising:
un-affiliating, subsequent to the affiliating, with the networking device after a specified period of time when the wireless apparatus has stopped receiving schedule definitions identifying other time periods allocated to the wireless apparatus.

15. The method of claim 14, wherein, subsequent to the un-affiliating with the networking device after the specified period of time, the wireless apparatus affiliates with a different networking device of the wireless network based on signal strength.

16. A wireless network device comprising:
a wireless transceiver, communicatively coupled with a processor, the wireless transceiver configured to transmit and receive communications via a wireless network;
the wireless transceiver configured to transmit a first schedule definition and a second schedule definition indicating downlink transmission times allocated for one of a plurality of wireless apparatuses within the wireless network;
the processor further configured to start a timer, for the one of the plurality of wireless apparatuses, at one of the indicated downlink transmission times;
the processor further configured to determine, during a duration of the timer, whether a downlink transmission including a message will be communicated to the one of the plurality of wireless apparatuses;
the processor further configured to discontinue transmission at expiration of the timer;
the processor further configured to send the downlink transmission to the one of the plurality of wireless apparatuses and to discontinue transmission when an acknowledgement is received before the timer has expired; and
the wireless transceiver configured to receive information from one of the plurality of wireless apparatuses at an uplink transmission time that is adjusted based on a determined amount of time drift.

17. The wireless network device of claim 16, wherein the one of the plurality of wireless apparatuses affiliates with the wireless network device or a different wireless network device based on signal strength.

18. A method performed by a wireless apparatus, the method comprising:
transmitting and receiving, by the wireless apparatus, communications via a wireless network;
receiving, by the wireless apparatus, a first schedule definition and a second schedule from a networking device of the wireless network;
determining, by the wireless apparatus from the received first schedule definition and the received second schedule definition, downlink reception times;
starting, by the wireless apparatus, a timer at one of the determined downlink reception times;
determining, by the wireless apparatus during a duration of the timer, whether a downlink transmission including a message is being communicated from the networking device to the wireless apparatus;
discontinuing, by the wireless apparatus, reception at expiration of the timer;
transmitting, by the wireless apparatus in response to reception of the downlink transmission, an acknowledgement and discontinuing reception before the timer has expired; and
adjusting, by the wireless apparatus, an uplink transmission time for a communication to the networking device based on a determined amount of time drift.

19. The method of claim 18, wherein the reception of the first and second schedule definitions comprises receipt in a plurality of time periods.

20. The method of claim 18 further comprising:
affiliating, by the wireless apparatus, with the networking device of the wireless network based on signal strength.

21. The method of claim 20, wherein the affiliation further comprises an assignment of an affiliation identifier to the wireless apparatus.

22. The method of claim 21, wherein the first or second schedule definition comprises a plurality of affiliation identifiers corresponding to a portion of a plurality of apparatuses.

23. The method of claim 18, wherein a portion of a wireless transceiver is powered down during a time period other than the determined downlink reception times.

24. The method of claim 23, wherein the powered down portion of the wireless transceiver is activated for the determined downlink reception times.

* * * * *